United States Patent
Kim et al.

(10) Patent No.: US 10,614,170 B2
(45) Date of Patent: Apr. 7, 2020

(54) METHOD OF TRANSLATING SPEECH SIGNAL AND ELECTRONIC DEVICE EMPLOYING THE SAME

(71) Applicant: Samsung Electronics Co., Ltd., Suwon-si, Gyeonggi-do (KR)

(72) Inventors: Sang-ha Kim, Seoul (KR); Eun-kyoung Kim, Suwon-si (KR); Ji-sang Yu, Seoul (KR); Jong-youb Ryu, Hwaseong-si (KR); Chi-youn Park, Suwon-si (KR); Jin-sik Lee, Suwon-si (KR); Jae-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/714,249

(22) Filed: Sep. 25, 2017

(65) Prior Publication Data

US 2018/0089176 A1  Mar. 29, 2018

(30) Foreign Application Priority Data

Sep. 26, 2016 (KR) .......................... 10-2016-0123385

(51) Int. Cl.
*G10L 15/26* (2006.01)
*G06F 17/28* (2006.01)
(Continued)

(52) U.S. Cl.
CPC .......... *G06F 17/289* (2013.01); *G06F 17/278* (2013.01); *G06F 17/2818* (2013.01);
(Continued)

(58) Field of Classification Search
CPC . G06F 17/289; G06F 17/2785; G10L 15/063; G10L 15/08; G10L 15/22; H05K 999/99
See application file for complete search history.

(56) References Cited

U.S. PATENT DOCUMENTS 5,917,944 A * 6/1999 Wakisaka ............ G06F 17/2755
382/190
6,161,083 A * 12/2000 Franz .................... G06F 17/271
704/4
(Continued)

FOREIGN PATENT DOCUMENTS

JP      5478478 B2    4/2014
JP   2014-123072 A    7/2014
(Continued)

OTHER PUBLICATIONS

International Search Report dated Jan. 23, 2018, issued in International Application No. PCT/KR2017/010557.

*Primary Examiner* — Neeraj Sharma
(74) *Attorney, Agent, or Firm* — Jefferson IP Law, LLP

(57) ABSTRACT

A method of translating a first language-based speech signal into a second language is provided. The method includes receiving the first language-based speech signal, converting the first language-based speech signal into a first language-based text including non-verbal information, by performing voice recognition on the first language-based speech signal, and translating the first language-based text into the second language, based on the non-verbal information.

16 Claims, 10 Drawing Sheets

(51) Int. Cl.
*G06F 17/27* (2006.01)
*G10L 15/22* (2006.01)

(52) U.S. Cl.
CPC .............. *G10L 15/22* (2013.01); *G10L 15/26* (2013.01); *G10L 15/265* (2013.01)

(56) References Cited

U.S. PATENT DOCUMENTS

| | | | | |
|---|---|---|---|---|
| 6,243,679 | B1* | 6/2001 | Mohri | G10L 15/193 704/10 |
| 6,266,642 | B1* | 7/2001 | Franz | G06F 17/271 704/257 |
| 7,853,444 | B2* | 12/2010 | Wang | G06F 17/2818 704/2 |
| 7,860,719 | B2* | 12/2010 | Maskey | G06F 17/2775 704/257 |
| 8,032,356 | B2* | 10/2011 | Narayanan | G06F 17/277 704/2 |
| 8,214,213 | B1* | 7/2012 | Ljolje | G10L 15/187 704/243 |
| 8,635,070 | B2* | 1/2014 | Sumita | G06F 17/2795 704/2 |
| 9,342,509 | B2* | 5/2016 | Meng | G06F 17/289 |
| 9,600,474 | B2* | 3/2017 | Cuthbert | G06F 17/289 |
| 9,613,027 | B2* | 4/2017 | Hwang et al. | |
| 2007/0050190 | A1* | 3/2007 | Washio | G10L 15/22 704/249 |
| 2007/0124133 | A1* | 5/2007 | Wang | G06F 17/2818 704/10 |
| 2007/0192107 | A1* | 8/2007 | Sitomer | G10L 15/26 704/270 |
| 2008/0046229 | A1* | 2/2008 | Maskey | G06F 17/2775 704/2 |
| 2008/0059188 | A1* | 3/2008 | Konopka | G10L 15/22 704/257 |
| 2008/0103769 | A1* | 5/2008 | Schultz et al. | |
| 2008/0306727 | A1* | 12/2008 | Thurmair et al. | |
| 2009/0157380 | A1* | 6/2009 | Kim et al. | |
| 2009/0182549 | A1* | 7/2009 | Anisimovich et al. | |
| 2010/0114556 | A1* | 5/2010 | Meng | G06F 17/289 704/2 |
| 2011/0238407 | A1* | 9/2011 | Kent | |
| 2011/0307241 | A1* | 12/2011 | Waibel | G10L 15/265 704/2 |
| 2012/0078607 | A1* | 3/2012 | Sumita | G06F 17/2795 704/2 |
| 2012/0136646 | A1* | 5/2012 | Kraenzel | G06F 17/2854 704/2 |
| 2012/0253785 | A1* | 10/2012 | Hamid | G06F 17/2229 704/4 |
| 2014/0200892 | A1* | 7/2014 | Yassa | G10L 13/00 704/257 |
| 2014/0303961 | A1* | 10/2014 | Leydon | G06F 17/28 704/2 |
| 2014/0337989 | A1* | 11/2014 | Orsini | H04L 51/12 726/26 |
| 2015/0058013 | A1* | 2/2015 | Pakhomov | G10L 25/78 704/243 |
| 2015/0073796 | A1* | 3/2015 | Kim | G10L 15/183 704/244 |
| 2016/0078020 | A1* | 3/2016 | Sumita | G06F 17/289 704/9 |
| 2016/0350290 | A1* | 12/2016 | Fujiwara | G06F 17/2854 |
| 2017/0085696 | A1* | 3/2017 | Abkairov | H04M 1/7255 |
| 2017/0206904 | A1* | 7/2017 | Bergman | G10L 17/02 |
| 2018/0068653 | A1* | 3/2018 | Trawick | G10L 15/187 |
| 2018/0144746 | A1* | 5/2018 | Mishra | G10L 25/51 |
| 2018/0157923 | A1* | 6/2018 | el Kaliouby, Jr. | G06K 9/00845 |
| 2018/0225283 | A1* | 8/2018 | Iwata | G06F 3/16 |

FOREIGN PATENT DOCUMENTS

| | | |
|---|---|---|
| KR | 10-2010-0068965 A | 6/2010 |
| KR | 10-1295642 B1 | 8/2013 |
| KR | 10-2014-0070703 A | 6/2014 |

* cited by examiner

METHOD OF TRANSLATING SPEECH SIGNAL AND ELECTRONIC DEVICE EMPLOYING THE SAME

CROSS-REFERENCE TO RELATED APPLICATION(S)

This application claims the benefit under 35 U.S.C. § 119(a) of Korean patent application filed on Sep. 26, 2016 in the Korean Intellectual Property Office and assigned Serial number 10-2016-0123385, the disclosure of which is hereby incorporated by reference.

TECHNICAL FIELD

The present disclosure relates to a method of translating a first language-based speech signal into a second language and outputting a translation result, and an electronic device employing the method.

BACKGROUND

Speech translation technologies are related to translation of an input first language-based speech signal into a second language, and may include a voice recognition step, a translation step, and a voice synthesis step. When a speech signal is input to an electronic device employing speech translation technology, voice recognition is performed on the input speech signal, and a first language-based text is generated as a result of the voice recognition. The electronic device translates the first language-based text into the second language in the translation step, thereby generating a second language-based text. Furthermore, the electronic device converts the second language-based text to voice of the second language in the voice synthesis step. As the voice of the second language is output through a speaker, a translation result with respect to the input speech signal is output.

However, a problem exists in that, in a speech translation process, since a speech signal undergoes several conversion steps, a translation result that is different from a speaker's intention may be output as a result of the speech translation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of translating a first language-based speech signal into a second language and outputting a translation result, and an electronic device employing the method, and more particularly, to a translation method using non-verbal information other than text included in a speech signal.

Additional aspects will be set forth in part in the description which follows and, in part, will be apparent from the description, or may be learned by practice of the presented embodiments.

In accordance with an aspect of the present disclosure, a method of translating a first language-based speech signal into a second language is provided. The method includes receiving the first language-based speech signal, converting the first language-based speech signal into a first language-based text including non-verbal information, by performing voice recognition on the first language-based speech signal, and translating the first language-based text into the second language, based on the non-verbal information.

In accordance with another aspect of the present disclosure, an electronic device for translating a first language-based speech signal into a second language is provided. The electronic device includes a receiver configured to receive the first language-based speech signal, a processor coupled to the receiver and an outputter, and configured to convert the first language-based speech signal into a first language-based text including non-verbal information, by performing voice recognition on the first language-based speech signal, and translate the first language-based text into the second language, based on the non-verbal information, and the outputter configured to output a result of the translation into the second language.

In accordance with yet another aspect of the present disclosure, provided is a non-transitory computer-readable recording medium having recorded thereon a program, which when executed by a processor causes the processor to control to receive a first language-based speech signal, convert the first language-based speech signal into a first language-based text including non-verbal information, by performing voice recognition on the first language-based speech signal, and translate the first language-based text into a second language, based on the non-verbal information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
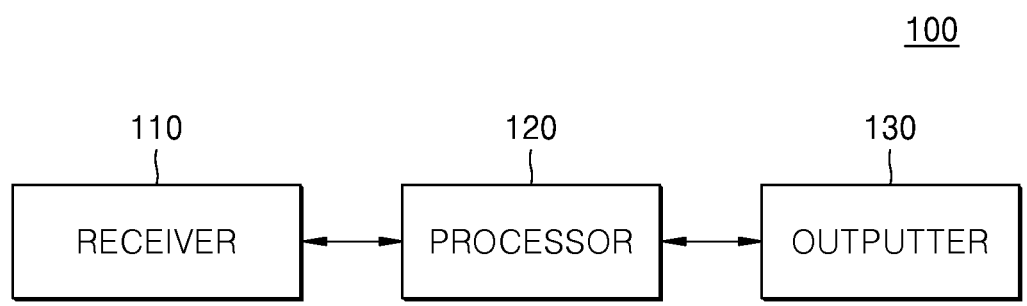
FIG. 1 is a block diagram of an electronic device for translating a first language-based speech signal into a second language, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to embodiments, examples of which are illustrated in the accompanying drawings, wherein like reference numerals refer to like elements throughout, and in the following description, for a more clear description of the present disclosure, parts or units that are not related to the descriptions are omitted. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The inventive concept may be described in terms of functional block components and various processing steps. Such functional blocks may be implemented by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language. Functional aspects may be implemented in algorithms that execute on one or more processors. Furthermore, the inventive concept may employ any number of various techniques for electronics configuration, signal processing and/or control, data processing and the like according to the related art. The words "mechanism" and "element" are used broadly and are not limited to mechanical or physical embodiments, but may include software routines in conjunction with processors, etc.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

Hereinafter, the present disclosure is described below in detail with reference to the accompanying drawings.

FIG. 1 is a block diagram of an electronic device 100 for translating a first language-based speech signal into a second language, according to an embodiment of the present disclosure.

Referring to FIG. 1, the electronic device 100 may include a receiver 110, a processor 120, and an outputter 130. In an embodiment, the electronic device 100 may convert an input speech signal of a first language to a speech signal of a second language, and output the speech signal of a second language to the outside. In an embodiment, the receiver 110 may include a microphone and the outputter 130 may include at least one of a speaker and a display. The receiver 110 may be a device for receiving textual input via an image, such as an image captured by a camera, on which an optical character recognition is performed. The receiver 110 may be a device for receiving video input of at least one of sign language, lip movement, facial expression, or body movement captured by a camera, on which a recognition is performed to determine the content of the at least one of sign language, lip movement, facial expression, or body movement. The outputter 130 may include a communication circuit though which the output of the processor 120 is communicated to an external apparatus.

The receiver 110 may receive a first language-based speech signal. For example, a speech signal of a first language including a speaker's speech may be received through the microphone of the receiver 110. In another example, the speech signal of a first language received through an external apparatus may be received by a communication circuit of the receiver 110.

The processor 120 may perform voice recognition on the first language-based speech signal, and thus the first language-based speech signal may be converted to a first language-based text including non-verbal information and the first language-based text may be translated into a second language. In an embodiment, the processor 120 may acquire at least one of divided sections of the first language-based text, may determine probability information of each divided section, and may, based on the determined probability information, translate the first language-based text into the second language, based on the determined probability information. In an embodiment, the processor 120 may output, as a result of the translation, a second language-based text corresponding to the first language-based text via the outputter 130.

In an embodiment, probability information of each section may be acquired based on a translation model. Furthermore, the probability information of each section may be acquired based on not only the translation model, but also a language model of the second language. According to an embodiment, the processor 120 may determine the probability information, acquired from the translation model and the language model, based on non-verbal information.

A translation model may include a probability value of at least one second language-based text corresponding to the first language-based text. In the translation model, the higher the probability value of the second language-based text, the more likely the second language-based text is to correspond to a translation result of the first language-based text. The processor 120 may obtain a second language-based text corresponding to the first language-based text and a probability value, by using the translation model.

The language model of the second language may include a probability value corresponding to a probability that each of second language-based texts will appear at a current position. For example, a language model of a text A may include a probability value corresponding to a probability that the text A will appear at a current position, on the condition that a text B adjacent to the text A exists at a certain position. The processor 120 may acquire a probability value of the second language-based text reflecting a degree of natural context, by using not only the translation model but also the language model of the second language.

In an embodiment, the probability information of each divided section in the first language-based text may include a probability value corresponding to a probability that the second language-based text is a translation result of each section. There may be a plurality of second language-based texts corresponding to the first language-based text. Accordingly, the probability information of each section may include at least one probability value as many as the number of the second language-based texts corresponding to each section.

In an embodiment, the processor 120 may divide the first language-based text in various units of words, phrases, sentences, etc. The processor 120 may divide the first language-based text according to whether the probability information of sections of the first language-based text exists in the translation model. For example, in the first language-based text, a section in which probability information exists in the translation model may be one section divided from the first language-based text. The processor 120 may acquire at least one second language-based text corresponding to each section and a probability value thereof, by using the probability value of the translation model.

In an embodiment, the processor 120 may divide the first language-based text into at least one section, and may combine the divided sections in various combinations and orders. As the sections are combined with one another, at least one second language-based text corresponding to the first language-based text may be obtained. The processor 120 may combine each section with at least one section adjacent thereto, thereby acquiring at least one combined section. The processor 120 may acquire probability information of the at least one combined section based on the probability information of the at least one combined section. The probability information of the combined section may include at least one probability value of the second language-based text corresponding to the combined section. The second language-based text of the combined section may be determined based on a combination of the second language-based texts corresponding to the at least one combined section.

For example, when second language-based texts corresponding to a section A are a1 and a2 and those corresponding to a section B are a1 b1 and b2, probability information of the combined section of the sections A and B may include a probability value with respect to at least one of (a1, b1), (a1, b2), (a2, b1), and (a2, b2) which are combinations of the second language-based texts. In an example, the probability information of the combined section may include n-number of probability values selected according to an n-best method, instead of including probability values of all combinations.

The probability value of each combination may be acquired based on the probability values of the second language-based texts forming the combination. Furthermore, the probability value of each combination may be determined based on non-verbal information included in the combined section.

For example, when pause information of the non-verbal information exists between the sections A and B, the processor 120 may determine probability information of a combined section including the pause information, based on the pause information. Since each of the sections A and B does not include non-verbal information, the probability values of the sections A and B may not be adjusted by the non-verbal information. However, since a combined section of the two sections includes non-verbal information, a probability value of the combined section of the two sections may be adjusted based on the non-verbal information. When a combined section of the sections A and B includes pause information, the processor 120 may determine a probability value of the combined section to be lower than the original value in consideration of the speaker's intention to have the meanings of the sections A and B distinguished from each other. Accordingly, the second language-based text corresponding to the combined section of the two sections may be unlikely to be output as a translation result as compared to a second language-based text corresponding to another combined section.

Furthermore, the processor 120 may acquire, in a translation process, a new combined section by combining each combined section with a section adjacent thereto. For example, the probability information of a combined section of the combined section of the sections A and B and a section C adjacent to the combined section, where the second language-based texts corresponding to the section C are c1 and c2, may include at least one probability value of combinations of the second language-based texts of ((a1, b1), c1), ((a1, b c2), ((a1, b2), c1), ((a1, b2), c2), ((a2, b1), c1), ((a2, b1), c2), ((a2, b2), c1), and ((a2, b2), c2). The probability value of each combination may be determined based on at least one of the probability values of the combined section of the sections A and B and at least one of the probability values of the section C. The probability information of a new combined section may include n-number of probability values selected according to the n-best method, instead of the probability values of all combinations described above.

In an embodiment, the processor 120 may perform, step by step, combination of a combined section and sections adjacent to the combined section, until all divided sections of the first language-based text are combined. Combined sections of various combinations may be obtained according to an order of combining sections. Whenever sections are combined, second language-based texts corresponding to the combined sections and probability values thereof may be determined. Accordingly, sections having different combining orders and combinations may have different second language-based texts and probability values thereof.

According to an embodiment, in a speech translation process, non-verbal information other than the text included in a speech signal may be lost. For the speech of the same text, non-verbal information of a speech signal, such as pitch, intensity, a pause, etc. of speech, may vary according to the speaker's intention. Accordingly, when the speech translation is performed without consideration of the non-verbal information of a speech signal, a translation result different from the speaker's intention may be output as a result of the speech translation.

The electronic device 100 according to an embodiment may perform a speech translation by using the non-verbal information other than the text included in a speech signal of a first language. The electronic device 100 performs a speech translation by using the non-verbal information, and thus it is possible to perform a speech translation considering the speaker's intention included in the non-verbal information. Accordingly, performance of the speech translation of the electronic device 100 may be improved.

In an embodiment, the non-verbal information may include information about at least one of a pause and a hesitation word. For example, when the non-verbal information includes information about a position where a pause occurs, the processor 120 may adjust the probability value of a section including the pause. As the probability value is adjusted, a result of translating the first language-based text into a second language may vary.

In an embodiment, when the non-verbal information includes information about hesitation words, the processor 120 may adjust the probability value based on the information about the hesitation words. For example, the processor 120 may adjust the probability value acquired for a section including hesitation words so that the hesitation words are translated into hesitation words of a second language. The processor 120 may adjust the probability value of a section including the hesitation word, based on the information about the hesitation words, and perform a translation based on the probability information including the adjusted probability value.

Furthermore, the processor 120 may exclude the hesitation words from a section including the hesitation words and acquire probability information of the section where the hesitation words are excluded, thereby performing a translation. For example, the processor 120 may exclude a first language-based text that is determined to be hesitation words, and perform a translation of the first language-based text.

The outputter 130 may output a result of the translation into a second language by the processor 120. For example, a second language-based text that is a result of the translation into the second language may be converted to speech to be output through a speaker.

The electronic device 100 according to an embodiment may include smartphones, tablet PCs, laptop computers, e-book terminals, wearable devices, etc., but is not limited thereto.

The electronic device 100 according to an embodiment may transmit to a server (not shown) a first language-based speech signal received by the receiver 110. In an embodiment, the server receiving the first language-based speech signal from the electronic device 100 may translate the first language-based speech signal into a second language. For example, like the processor 120 of the electronic device 100, the server may perform a translation of the first language-based speech signal into the second language.

The server according to an embodiment may transmit a second language-based speech signal to the electronic device 100, as a translation result of the first language-based speech signal. The electronic device 100 may output, through the outputter 130, the second language-based speech signal received from the server.

Alternatively, the server according to an embodiment may transmit the second language-based text to the electronic device 100, as a translation result of the first language-based speech signal. The electronic device 100 may convert the second language-based text received from the server to the second language-based speech signal, and output the second language-based speech signal through the outputter 130.

In an embodiment, when a speech signal of a first language from a speaker is input to the electronic device 100, a speech signal of a second language that is a translation result of the speech signal of a first language may be output by the electronic device 100. Accordingly, the speaker may smoothly communicate with a counterpart who uses a language different from a language the speaker uses, through the electronic device 100.

The non-verbal information according to an embodiment may be acquired based on non-verbal characteristic information of an input speech signal, for example, information about a speech interval, a silence interval, voice pitch, intensity, frequency, a speech rate, etc. In an embodiment, the non-verbal information may include information about emphasized vocabularies, information about sentence patterns, information about non-standard words, and information about a pause and a hesitation word, which may be acquired based on the above-described non-verbal characteristic information of a speech signal.

According to an embodiment, the information about emphasized vocabularies may include information about an emphasized section in the first language-based text. For example, a section in which a volume of speech is larger than that in another section may be determined to be an emphasized section. According to an embodiment, when detecting the information about emphasized vocabularies, the electronic device 100 may add a tag indicating an emphasized vocabulary in the first language-based text that is a result of voice recognition.

According to an embodiment, in order to have the emphasized vocabulary translated into a second language of a primary meaning, a probability value of a section including the emphasized vocabulary may be adjusted.

For example, when the first language and the second language are English and Korean, respectively, and an input sentence is "I have plans to leave", where the vocabulary of "plans" is emphasized, the electronic device 100 may adjust the probability value of a section including "plans" to include "gyehoek" that is a primary meaning of "plans" in a translated sentence. In an example, the electronic device 100 may adjust the probability value of a second language-based text including "gyehoek" among the probability information of the section including "plans", to a larger value.

According to an embodiment, information about sentence patterns may include information about a sentence type of a first language-based text, for example, interrogative sentences, declarative sentences, imperative sentences, etc. In an example, the information about sentence patterns may be determined based on a pitch of speech. There are many cases where the word order and the end of a sentence do not change even when sentence patterns are different. For example, a sentence type may be changed from a declarative sentence to an interrogative sentence as a speaker increases a speech pitch at an end of a sentence. Accordingly, when a translation is performed considering only a text of a first language that is voice-recognized, without considering the information about sentence patterns obtained from the non-verbal characteristics of a speech signal, unlike the speaker's intention, the speech signal may be mistranslated into a sentence of an incorrect sentence type.

The electronic device 100 according to an embodiment may acquire the information about sentence patterns based on the non-verbal characteristic information of a speech signal. When the information about sentence patterns is detected from the speech signal, the electronic device 100 may add a tag indicating a sentence type to the first language-based text that is a result of the voice recognition.

According to an embodiment, the electronic device 100 may adjust the probability value used for a translation based on the information about sentence patterns of the first language-based text. For example, when the first language and the second language are Korean and English, respectively, an input sentence is "jeongmal geuleohge saenggaghae", a sentence type of the input sentence may be determined based on a pitch of a speech signal. When a pitch of the speech signal corresponding to "hae" of the input sentence is high, the electronic device 100 may determine the sentence type of the input sentence to be an interrogative sentence.

According to an embodiment, the electronic device 100 may adjust the probability value of a section so that a received speech signal is translated into a sentence including a vocabulary used for interrogative sentences. For example, the probability value may be adjusted so that the speech signal is translated into a sentence including an interrogative pronoun such as "who", "do", etc., instead of a sentence that does not include the interrogative pronoun. When "jeongmal geuleohge saenggaghae" is an interrogative sentence, the probability value may be adjusted so that a sentence "Do you really think so", instead of "I really think so", may be output as a sentence translated from the speech signal. In an example, the electronic device 100 may adjust the probability value of the second language-based text including "Do" that is an interrogative pronoun, to be a larger value.

According to an embodiment, information about non-standard words may include information about a vocabulary indicating non-standard words of the first language-based text. To prevent the non-standard words from being translated into a vocabulary of the second language having meanings different from the speaker's intention, the electronic device 100 may perform a translation based on the information about non-standard words.

For example, the non-standard words may include dialect, slang, jargon, etc., and frequency of use, intonation, intensity, etc. of each of the non-standard words may be different according to the speaker's language habits. Since the non-standard words may be different in frequency of use, intonation, intensity, etc. according to the speaker, different pieces of information according to the speaker may be used to detect the non-standard words. When detecting the information about non-standard words, the electronic device 100 may add a tag indicating a non-standard word or a tag indicating a standard word having the same meaning as the detected non-standard word, to the first language-based text that is a result of the voice recognition. The electronic device 100 may adjust the probability value of a section including the non-standard word so that the detected vocabulary including a non-standard word is translated according to the speaker's intention. In an example, the electronic device 100 may adjust the probability value of the second language-based text including a non-standard word to be a larger value, based on the information about non-standard words.

According to an embodiment, information about a pause and a hesitation word may include information about a section of the first language-based text, in which a pause or a hesitation word exists, as the non-verbal information. According to an embodiment, the electronic device 100 may acquire probability information about the section in which a pause or a hesitation word exists, based on the information about a pause or a hesitation word.

According to an embodiment, considering that an intentional pause of a speaker may be made to distinguish meaning, the electronic device 100 may determine the probability value of a section with which a section including a pause is primarily combined to be a lower value than the original value, when performing a translation.

Furthermore, considering that the hesitation word is not of a vocabulary spoken by the speaker to distinguish meaning, the electronic device 100 may determine the probability information of each section to prevent the hesitation word from affecting a translation of other vocabularies. Since the probability information may be acquired based on not only the translation model, but also further the language model of the second language, the hesitation word may affect the translation of other adjacent vocabularies. Accordingly, the electronic device 100 according to an embodiment may determine the probability information so that a hesitation word of the first language-based text is translated into a hesitation word of the second language, or may determine the probability information of each section after excluding the section including the hesitation word from the first language-based text.

According to an embodiment, when detecting the information about a pause or a hesitation word, the electronic device 100 may add a tag indicating a position where a pause occurs or a tag indicating a hesitation word, to the first language-based text that is a result of the voice recognition.

The non-verbal information is not limited to the above-described examples, and may include various types of information that are determined based on the non-verbal characteristics of a speech signal input to the electronic device 100.

Figure 2:
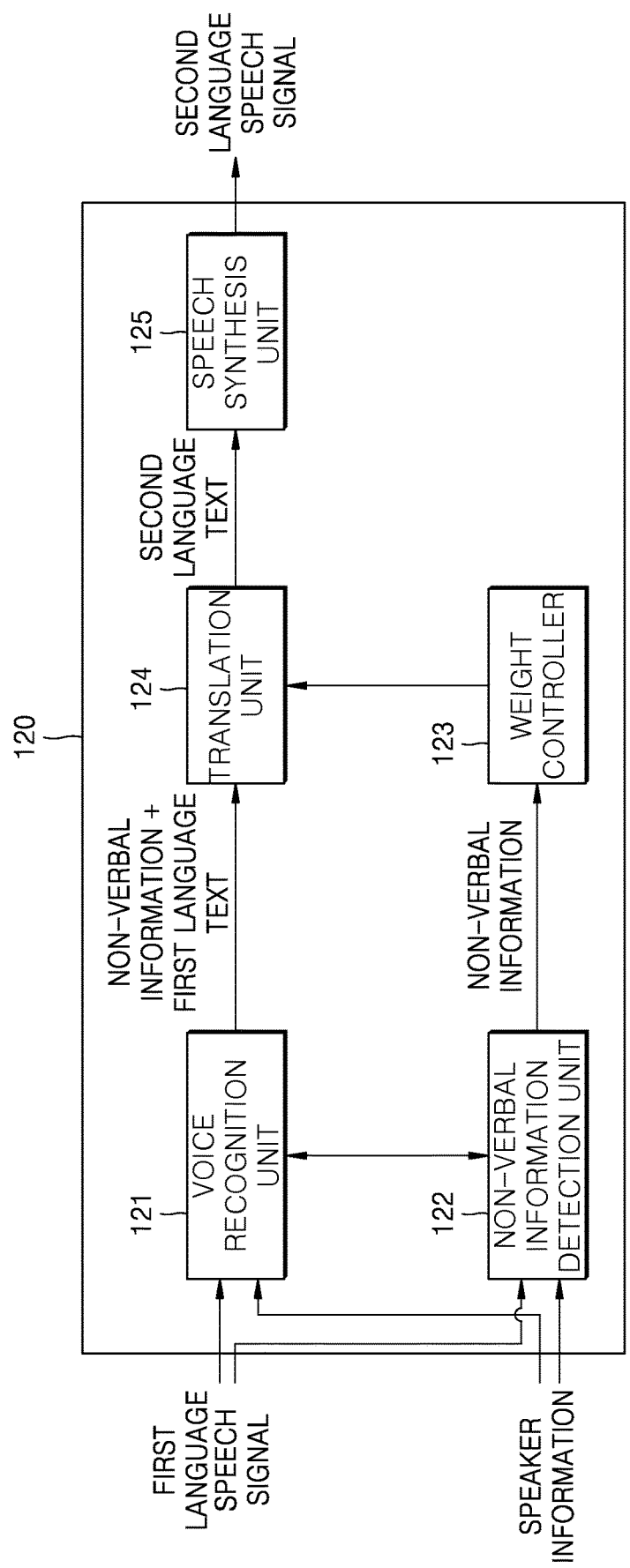
FIG. 2 is a block diagram of a processor according to an embodiment of the present disclosure.

FIG. 2 is a block diagram of the processor 120 according to an embodiment of the present disclosure.

Referring to FIG. 2, the processor 120 of the electronic device 100 may include a voice recognition unit 121, a non-verbal information detection unit 122, a translation unit 124, a weight controller 123, and a speech synthesis unit 125. The processor 120 of FIG. 2 is merely an embodiment and may include a variety of constituent elements.

The voice recognition unit 121 may perform voice recognition on a speech signal of a first language including speaker's speech. The voice recognition unit 121 may generate a first language-based text as a result of the voice recognition. The first language-based text may correspond to a speaker's speech content included in the first language speech signal. The voice recognition unit 121 may perform voice recognition by using a speech model, a language model, etc., which varies according to the speaker. The first language-based text generated by the voice recognition unit 121 may further include non-verbal information detected by the non-verbal information detection unit 122.

The non-verbal information detection unit 122 may detect non-verbal information on the first language-based speech signal by analyzing the first language-based speech signal input to the electronic device 100. For example, the non-verbal information detection unit 122 may detect non-verbal information from the first language speech signal by analyzing a speech interval, a silence interval, a voice pitch, intensity, a frequency, a speech rate, etc. of the first language speech signal. When the non-verbal information is detected, a tag indicating non-verbal information may be added with respect to a section of the first language-based text where the non-verbal information occurs. The non-verbal information detection unit 122 may detect the non-verbal information from the first language speech signal by further using a result of the voice recognition by the voice recognition unit 121, speaker information, etc. The speaker information may include information to identify the speaker.

The non-verbal information that may occur in the speaker's speech signal may vary according to the speaker's language habit or surrounding environment. Accordingly, the non-verbal information detection unit 122 may differently set weight applicable to the probability information or condition information to detect the non-verbal information, according to the speaker, for example, the non-verbal information such as a pause, a hesitation word, a non-standard word, an emphasized vocabulary, etc. The electronic device 100 may adjust at least one probability value included in the probability information of a certain section by applying a weight value to the probability information. As the non-verbal information detection unit 122 differently sets the condition to detect non-verbal information according to the speaker, or a weight applicable to the probability information according to the non-verbal information, detection performance of the non-verbal information and performance of a speech translation may be improved.

According to an embodiment, the non-verbal information may be detected in the same method as in a method of performing voice recognition by using a language model, a speech model, a pronunciation dictionary, etc. in a voice recognition process. For example, probability information that each piece of the non-verbal information will appear, pronunciation information, etc. may be included in a database of a language model, a speech model, a pronunciation dictionary, etc. which may be used for voice recognition. By using a database that may also detect the non-verbal information during voice recognition, the non-verbal information may be included in a result of the voice recognition. According to an embodiment, the non-verbal information detection unit 122 may determine whether to insert the non-verbal information to the first language-based text that is voice recognized based on a detection condition of the non-verbal information, in addition to the non-verbal information detected in the voice recognition process.

The non-verbal information detected by the non-verbal information detection unit 122 may be transferred to the weight controller 123.

The weight controller 123 may adjust the probability value of a certain text section based on the non-verbal information. The weight controller 123 may acquire a weight to be applied to the probability information, and apply the acquired weight to a probability value of the probability information based on the non-verbal information. The weight value may be a preset value. For example, the weight value may be determined to be a value that expects optimal translation performance, based on a text corpus used to establish a database such as a translation model, a language model, etc. Furthermore, the weight value may be determined based on a user's feedback to a translation result. Furthermore, the weight value may be determined to be a value varying according to the speaker. For example, a weight value determined based on a text corpus that varies according to the speaker may be used.

The translation unit 124 may translate the first language-based text including the non-verbal information into a second language. According to an embodiment, the translation unit 124 may translate the first language-based text into the second language-based on the non-verbal information.

For example, the translation unit 124 may determine the probability information of a section including the non-verbal information based on the non-verbal information. The translation unit 124 may acquire at least one second language-based text corresponding to the first language-based text, based on the probability information of each section. The at least one second language-based text may have a probability value determined based on the probability information of each section. The order of priority of the at least one second language-based text may be determined based on the probability value. The translation unit 124 may output the at least one second language-based text according to the order of priority, as a translation result.

As the probability value of the second language-based text corresponding to each section varies according to the probability information, different translation results may be output. Accordingly, the determination of the probability information may significantly affect the translation performance. According to an embodiment, as the probability value is adjusted according to the speaker's speech intention based on the non-verbal information, the translation performance may be improved.

The translation unit 124 may generate the second language-based text by performing a translation according to the determined probability information.

The speech synthesis unit 125 may convert the second language-based text generated by the translation unit 124 to speech, and output a converted speech signal. The speech signal may be output through the speaker provided in the electronic device 100 or a speaker apparatus existing outside the electronic device 100. According to an embodiment, the speech synthesis unit 125 may convert the second language-based text to the speech signal by using text-to-speech (TTS) technology. The speech synthesis unit 125 may generate a speech signal of the second language-based text corresponding to the first language speech signal, considering the non-verbal characteristics such as a speech interval, a silence interval, a voice pitch, intensity, a frequency, a speech rate, etc. of the first language speech signal non-verbal characteristics.

Figure 3:
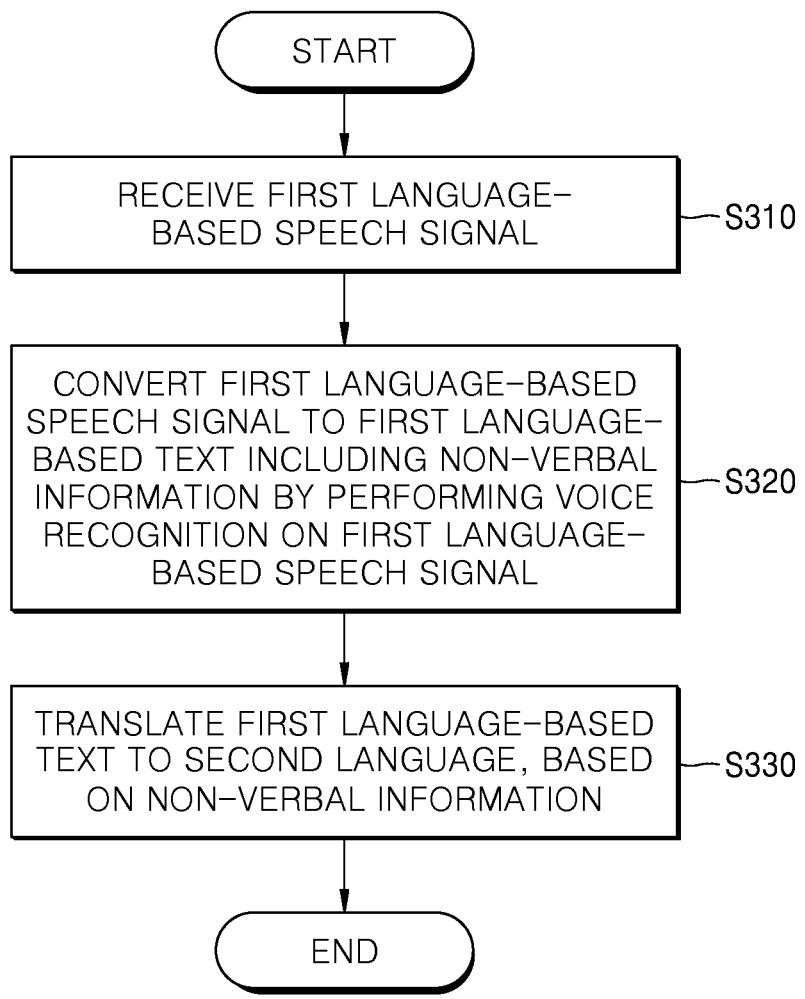
FIGS. 3 and 4 are flowcharts of methods of translating a first language-based speech signal into a second language, according to various embodiments of the present disclosure.

FIG. 3 is a flowchart of a method of translating a first language-based speech signal into a second language according to an embodiment of the present disclosure.

According to an embodiment, the method of FIG. 3 may be performed by the electronic device 100 of FIG. 1.

Referring to FIG. 3, in operation S310, the electronic device 100 may receive a first language-based speech signal. In an embodiment, the first language-based speech signal is a speech signal that is to be translated into another language by the electronic device 100, and may be received by the electronic device 100 via a microphone.

In operation S320, the electronic device 100 may convert the first language-based speech signal to a first language-based text including non-verbal information, by performing voice recognition on the first language-based speech signal received in operation S310. The electronic device 100 may generate the first language-based text corresponding to the first language-based speech signal as a result of the voice recognition. In an embodiment, the electronic device 100 may detect non-verbal information included in the first language-based speech signal, and add the detected non-verbal information to the first language-based text. For example, a tag indicating the non-verbal information may be added to a section of the first language-based text where the non-verbal information is detected.

In operation S330, the electronic device 100 may translate the first language-based text to a second language, based on the non-verbal information included in the first language-based text. In an embodiment, the electronic device 100 may determine probability information of each section of the first language-based text based on the non-verbal information, and may acquire at least one second language-based text corresponding to the first language-based text by using the determined probability information.

In an embodiment, the second language-based text output as a translation result may be converted to a speech signal and output via a speaker.

Figure 4:
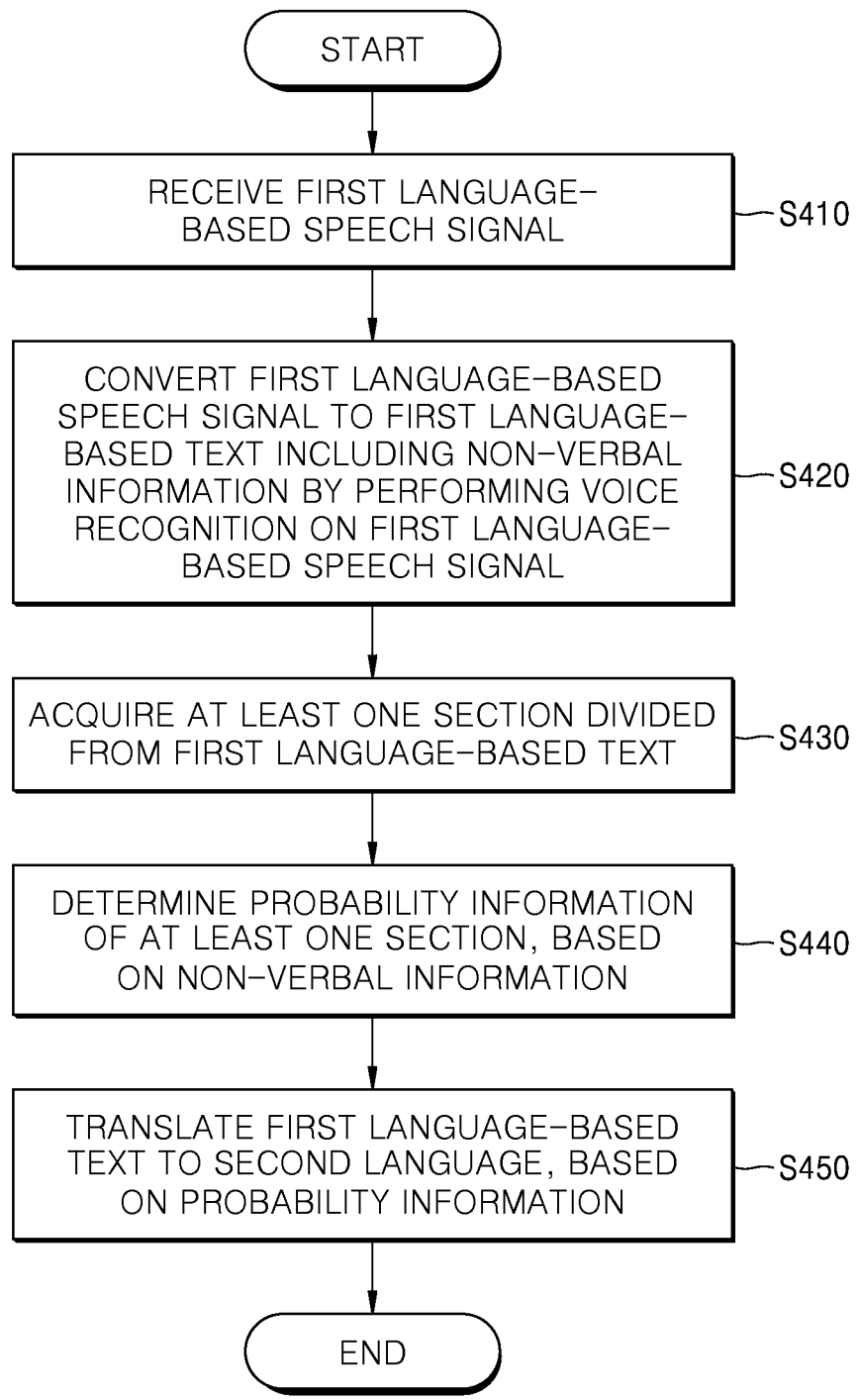

FIG. 4 is a flowchart of a method of translating a first language-based speech signal into a second language, according to an embodiment of the present disclosure. The translation method of FIG. 4 may further include an operation of determining probability information of at least one section of the first language-based text, based on the non-verbal information. Operations S410 and S420 of FIG. 4 may correspond to operation S310 and S320 of FIG. 3.

According to an embodiment, the method of FIG. 4 may be performed by the electronic device 100 of FIG. 1.

Referring to FIG. 4, in operation S410, the electronic device 100 may receive the first language-based speech signal.

In operation S420, the electronic device 100 may convert the first language-based speech signal to the first language-based text including non-verbal information, by performing voice recognition on the first language-based speech signal received in operation S410.

In operation S430, the electronic device 100 may acquire at least one section divided from the first language-based text. For example, the electronic device 100 may divide the first language-based text into at least one section according to whether the text has probability information in the translation model.

According to an embodiment, the section divided from the first language-based text may be divided not to overlapping other divided sections. For example, when the first language-based text includes a text "naneun neoleul salanghae", and probability information about "naneun neoleul salanghae", "naneun", "neoleul", and "salanghae" exist in the translation model, in the first case, "Naneun neoleul salanghae" is divided into one section and then translation may be performed. Furthermore, in the second case, "naneun", "neoleul", and "salanghae" are divided into different sections and then translation may be performed. In each case, as a result of the translation, at least one second language-based text corresponding to the first language-based text may be acquired.

In operation S440, the electronic device 100 may determine the probability information of at least one section based on the non-verbal information. According to an embodiment, based on the non-verbal information, the electronic device 100 may determine the probability value acquired based on the translation model to be a different value. For example, the electronic device 100 may apply a weight to the probability value based on the non-verbal information.

As the electronic device 100 determines the probability information of each section based on the non-verbal information and output a translation result close to the speaker's intention, a speech translation may be performed with more improved performance.

In operation S450, the electronic device 100 may translate the first language-based text into the second language-based on the probability information determined in operation S440. In an embodiment, the electronic device 100 may acquire the at least one second language-based text corresponding to the first language-based text, according to the probability information determined based on the non-verbal information.

The at least one second language-based text may have the probability value determined in operation S440. The electronic device 100 may determine the second language-based text that is output as a translation result according to the probability value of the second language-based text. For example, a second language-based text having the largest probability value may be output as a translation result. In an embodiment, the second language-based text output as a translation result may be converted to the speech signal and output via the speaker.

Figure 5:
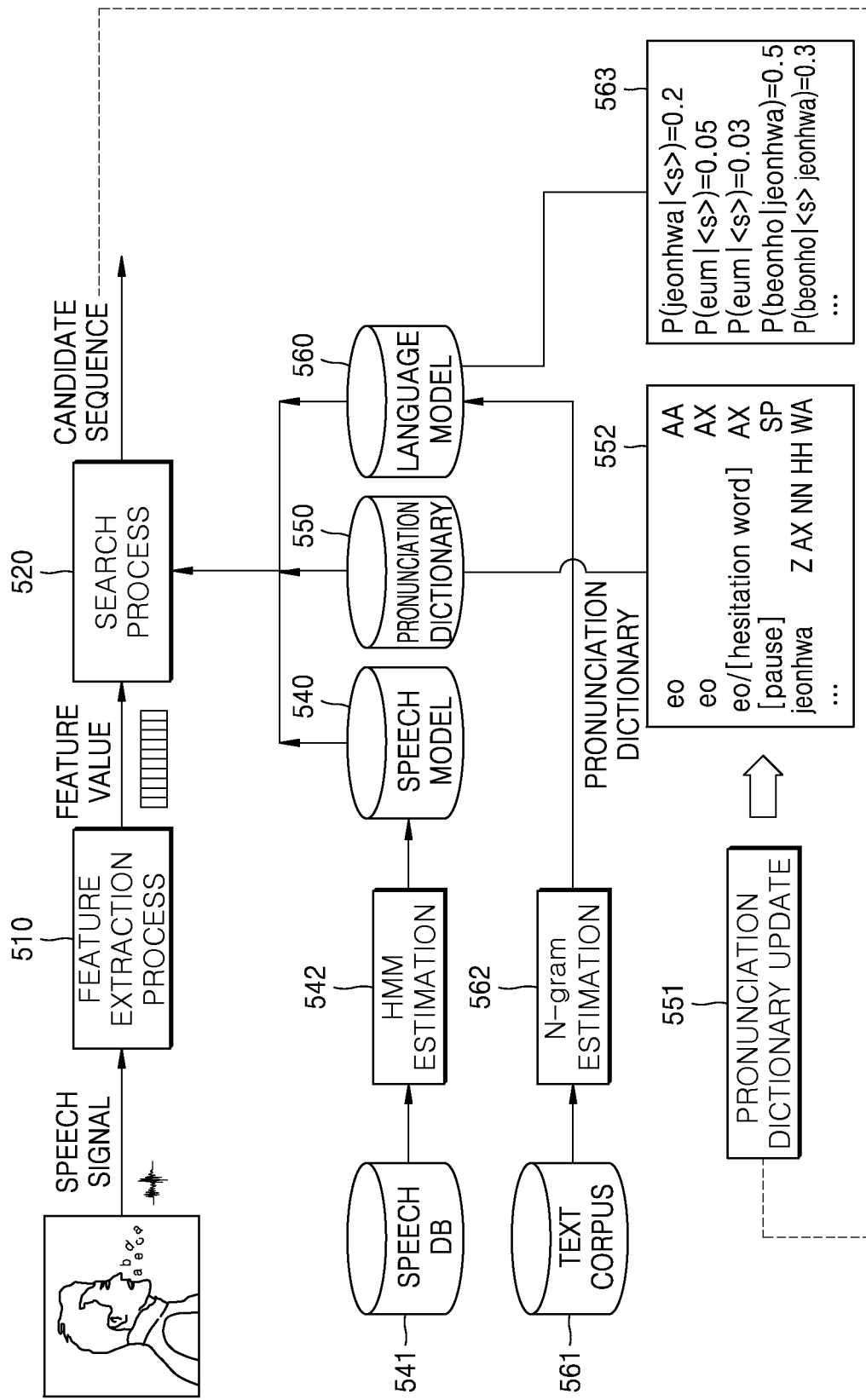
FIG. 5 is a block diagram of a method of performing voice recognition, according to an embodiment of the present disclosure.

FIG. 5 is an example of a method of performing voice recognition, according to an embodiment of the present disclosure.

According to an embodiment, the method of performing voice recognition of FIG. 5 may be performed by the electronic device 100 of FIG. 1.

Referring to FIG. 5, in a feature extraction process 510, feature information may be extracted from an input speaker's speech signal. As only a portion of the speech signal where the speaker actually speaks may be detected from the input speech signal, information indicating a feature of the speech signal may be extracted. The information indicating the feature of the speech signal may include, for example, information indicating the shape of a mouth or the position of a tongue according to a waveform to which the speech signal belongs.

According to an embodiment, the non-verbal information may be detected in the feature extraction process 510 during a voice recognition process. For example, as the feature of the speech signal corresponding to the non-verbal information is detected, the non-verbal information may be detected.

Furthermore, without a resource such as a pronunciation dictionary 550 and a language model 560 to detect non-verbal information, the non-verbal information may be detected based on condition information to detect the non-verbal information. The condition information to detect the non-verbal information may include condition information about non-verbal characteristics of a speech signal indicating, for example, a speech interval, a silence interval, a voice pitch, intensity, a speech rate, a frequency, etc. of the speech signal. Accordingly, according to an embodiment, without a resource such as the pronunciation dictionary 550 and the language model 560 to detect the non-verbal information, the non-verbal information such as a pause, a hesitation word, an emphasized vocabulary, etc. may be detected.

The detected non-verbal information may be included in a candidate sequence that is a result of the voice recognition, as a tag indicating the non-verbal information. The tag indicating the non-verbal information may be inserted in a text of a first language determined among the candidate sequence based on a condition for detecting the non-verbal information.

In a search process 520, a candidate sequence corresponding to a speech signal may be searched for from feature information extracted in the feature extraction process 510, based on at least one of a speech model 540, the pronunciation dictionary 550, and the language model 560. The candidate sequence may include texts corresponding to speech contents of the speech signal. According to an embodiment, the candidate sequence may further include not only text, but also the tag indicating the non-verbal information.

The speech model 540 may include probability information to detect a pronunciation string, a character string, a word string, etc. from the feature information of a speech signal. In an example, the speech model 540 may include the probability information about a pronunciation string, a character string, a word string, etc. corresponding to the feature information. The probability information included in the speech model 540 may indicate a degree of matching between a speech signal and a pronunciation string, a character string, a word string, etc. At least one of a pronunciation string, a character string, a word string, etc. may be determined to be a candidate string corresponding to the speech signal according to the probability information.

The speech model 540 may be generated by a statistical method, for example, a hidden Markov model (HMM) estimation process 542, from a speech database (DB) 541 including a large amount of speech data as illustrated in FIG. 4. The speech model 540 may be generated from speech data of unspecified speakers or speech data of a specified speaker. Accordingly, the speech model 540 that is individually applicable according to the speaker may be used.

The speech model 540 may include probability information to directly detect at least one character string or word string corresponding to the feature information. In this case, the speech model 540 may include probability information about a character string or a word string that is generated by training a neural network based on a large amount of the speech DB 541, instead of the HMM estimation process 542. In an embodiment, when the electronic device 100 directly detects a character string or a word string, not a pronunciation string, through the speech model 540, the pronunciation dictionary 550 that is described later may not be explicitly used.

The pronunciation dictionary 550 may include pieces of information to acquire words corresponding to the candidate string detected through the speech model 540. In an embodiment, the pronunciation dictionary 550 may be established from the pronunciation strings acquired considering a phonological change phenomenon with respect to each word. The pronunciation dictionary 550 may include pairs of words corresponding to each pronunciation string. The pronunciation of a word may not be uniform because the pronunciation of a word may be changed according to neighboring words of the word or a position in a sentence, characteristics of a speaker, etc. Accordingly, in the pronunciation dictionary 550, there may be a plurality of pronunciation strings that correspond to one word, or a plurality of words that correspond to one pronunciation string. Furthermore, a plurality of word strings converted from the pronunciation strings may exist according to the pronunciation strings corresponding to the speech signal and the pronunciation dictionary 550. Since the established data of the pronunciation dictionary 550, like the speech model 540, may be different according to the speaker, data may be individually established and used according to the speaker.

According to an embodiment, the pronunciation dictionary 550 may further include information about words including the non-verbal information. Referring to data 552 of the pronunciation dictionary 550 of FIG. 3, not only a pronunciation string "AA" and "AX" corresponding to a word "eo", but also pronunciation string information corresponding to a word "eo/[hesitation word]", for example, "eo" as a hesitation word may exist. Furthermore, in the data 552 of the pronunciation dictionary 550, pronunciation string information corresponding to "[pause]" that is a tag indicating a section where a pause occurs may exist. The pronunciation string of a speech signal extracted from the speech model 540 may be converted to a word or a word string including the non-verbal information based on the pronunciation dictionary 550. Accordingly, as the pronunciation dictionary 550 capable of detecting the non-verbal information is used, as a result of the voice recognition, a candidate sequence including the non-verbal information may be generated.

In an embodiment, when not a pronunciation string, but a character string or a word string is directly detected through the speech model 540, the speech model 540 may include a word string or a character string including the non-verbal information. Accordingly, the character string or word string acquired based on the speech model 540 may further include the non-verbal information.

The language model 560 may include the probability information of a word based on the entire context.

For example, the language model 560 may include P(B|A) that is information about a probability that a word B will appear on the condition that a word A appears, as the probability information about the word B. In another example, the language model 560 may include P(B|A C) that is probability information about the word B on the condition that a plurality of words appear, for example, words A and C appear, as the probability information about the word B. In another example, the language model 560 may include P(B) that is appearance probability information about the word B. The P(B) may indicate a probability that the word B will appear during voice recognition.

Referring to an example 563 of data of the language model 560, on the condition that words such as a space (<s>) or "jeonhwa" appear, information about a probability that each of words "jeonhwa", "eumeum", or "eo" will appear may exist. The probability information of the language model 560 about the word strings may be determined based on the probability information of the language model 560 about vocabularies forming each word string. Furthermore, the order of the respective word strings may be determined according to the probability information about the word strings, and a candidate sequence may be determined according to the order of the word strings. For example, at least one word string may be determined to be a candidate sequence according to the order of word strings. Furthermore, among the candidate sequence, a text of the first language including the non-verbal information may be finally acquired according to a detection condition of the non-verbal information.

The language model 560 may be established by a method of N-gram estimation 562 from a text corpus 561 that is corpuses of texts. The present disclosure is not limited to the N-gram estimation method, and the language model 560 may be established by a variety of methods.

The text corpus 561 used for establishing the language model 560 may include different data according to an individual user. For example, the text corpus 561 that is used or has been used by an individual user may be used for the establishment of the language model 560. Accordingly, according to an embodiment, different language models according to the speaker information may be used as the language model 560. The present disclosure is not limited thereto, and the language model 560 may be established based on the text corpus 561 regardless of the user or speaker, and may be used for voice recognition.

In addition, a pronunciation dictionary update 551 may be performed on the pronunciation dictionary 550 based on the candidate sequence. For example, of pairs of a word included in the candidate sequence and a pronunciation string corresponding to each word, when a pair that does not included in the pronunciation dictionary 550 exists, the pronunciation dictionary 550 may be updated. For example, of the non-verbal information detected based on the feature information extracted in the feature extraction process 510, or detected in other methods, the non-verbal information that is not included in the pronunciation dictionary 550 may be included in the candidate sequence. Accordingly, the non-verbal information that is not included in the pronunciation dictionary 550 may be newly added to the pronunciation dictionary 550.

A method of adding information about a pause or a hesitation word as the non-verbal information to the first language-based text in the voice recognition process is described below in detail, with reference to FIGS. 6 and 7. According to an embodiment, the method illustrated in FIGS. 6 and 7 may be performed by the electronic device 100 of FIG. 1.

Figure 6:
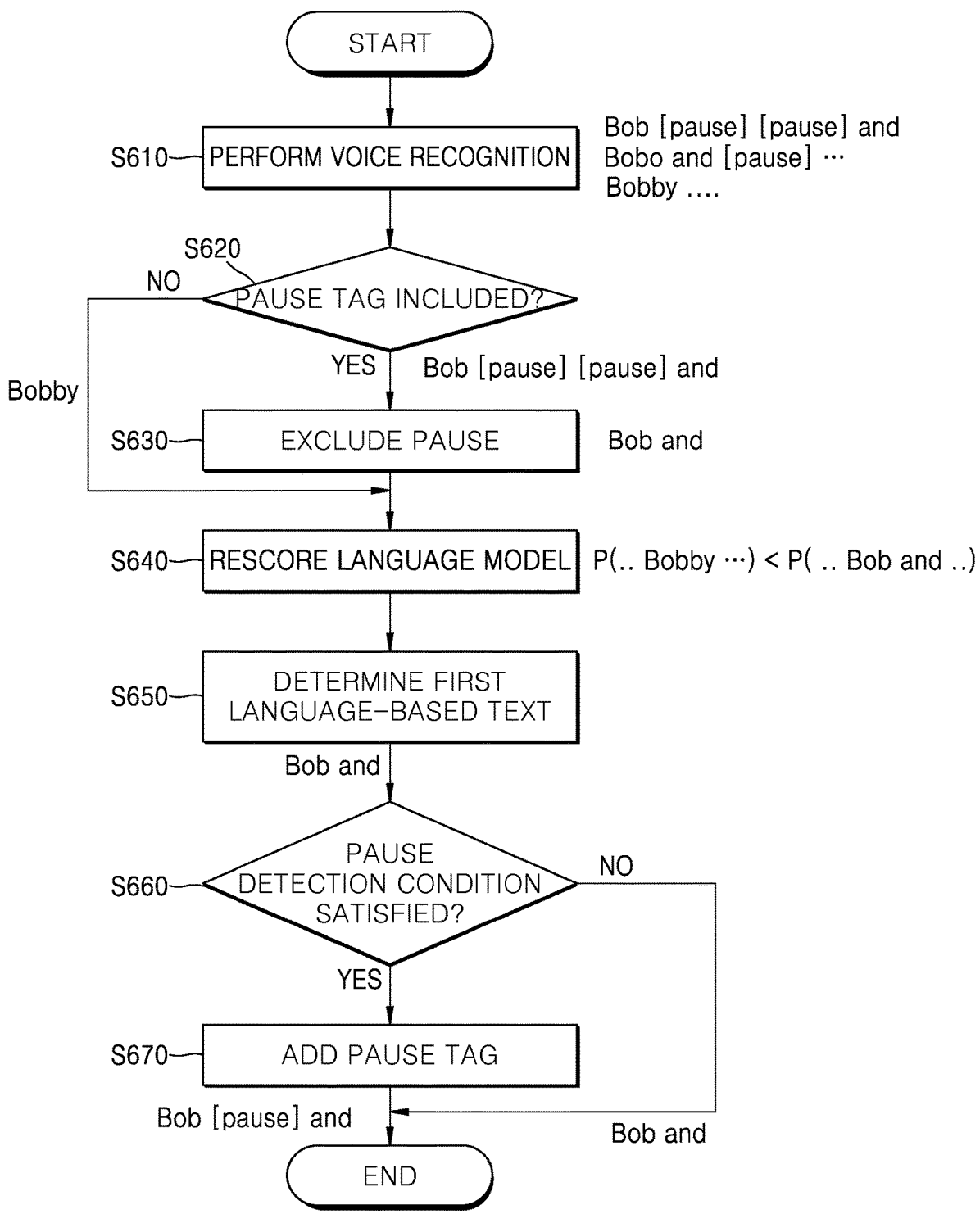
FIG. 6 is a flowchart of a method of adding pause information to a first language-based text, according to an embodiment of the present disclosure

FIG. 6 is a flowchart of a method of adding pause information to the first language-based text, according to an embodiment of the present disclosure.

Referring to FIG. 6, in operation S610, the electronic device 100 may acquire at least one candidate sequence by performing voice recognition on the first language-based speech signal. In an embodiment, the electronic device 100 may use the pronunciation dictionary 550, the language model 560, etc. capable of detecting the non-verbal information during the voice recognition. Accordingly, the electronic device 100 may acquire candidate sequence including the non-verbal information as a result of the voice recognition.

For example, as illustrated in operation S610 of FIG. 6, a tag indicating pause may be added at a position where the pause occurs in the candidate sequence. As a word including the pause tag is included in the pronunciation dictionary 550 or the language model 560, a candidate sequence including the pause tag may be acquired. Alternatively, when a feature corresponding to the pause is extracted in the feature extraction process 510, a tag indicating the position where the pause occurs may be inserted in the candidate sequence.

In an example, as illustrated in FIG. 6, "Bob [pause] [pause] and . . . ", "Bobo and [pause] . . . ", and "Bobby . . . " may be acquired as a candidate sequence with respect to the same speech signal section.

In operation S620, the electronic device 100 may determine whether the candidate sequence includes a pause tag. When the candidate sequence includes a pause tag, in operation S630, the electronic device 100 may exclude the pause tag from the candidate sequence to obtain a probability value according to the language model 560 with respect to the candidate sequence where the pause tag is excluded. For example, "Bob and . . . " and "Bobo and . . . " may be acquired as the candidate sequence excluding the pause tag.

In operation S640, the electronic device 100 may perform rescoring on the candidate sequence excluding the pause tag, based on the language model 560. The electronic device 100 may obtain the probability value of the candidate sequence excluding the pause tag again, by using the language model 560, For example, a probability value based on the language model 560 may be obtained again with respect to "Bob and . . . " and "Bobo and . . . " excluding the pause tag. The electronic device 100 may perform rescoring based on the language model 560 by comparing the probability value of the candidate sequence that is obtained again with a probability value of another candidate sequence.

Since the non-verbal information like a pause tag is information that is not represented in a text, it may be difficult to collect the non-verbal information as the text corpus 561. Accordingly, accuracy of a probability value of a text including the non-verbal information and included in the language model 560 may be lower than that of a probability value of other texts. Since the probability value of the candidate sequence acquired in the voice recognition process S610 is the probability value of the candidate sequence including the pause tag, the electronic device 100 may obtain again the probability value of the candidate sequence that does not include a pause tag. The electronic device 100 may determine a first language-based text of the candidate sequence based on the probability value obtained again.

In operation S650, the electronic device 100 may determine a first language-based text from the candidate sequence obtained in operation S610, based on the order of priority determined through the rescoring. According to an embodiment, the electronic device 100 may determine the first language-based text based on the order of priority of each candidate sequence that is a result of the rescoring. For example, "Bob and" that is a candidate sequence having the highest order of priority may be determined to be the first language-based text.

In operation S660, the electronic device 100 may determine whether the first language-based text determined in operation S650 and the speech signal satisfy a pause detection condition. It may be determined whether there is a location where the pause detection condition is satisfied, in the first language-based text determined in operation S650. For example, in operation S630, when "Bob and" that is the candidate sequence excluding the pause tag is determined to be the first language-based text, it may be determined whether the location excluding the pause tag satisfies the pause detection condition. Although the pause tag detected in operation S610 is excluded in operation S630, the electronic device 100 may add the excluded pause tag to the first language-based text based on the pause detection condition.

The pause detection condition may include, for example, the length of a section where a pause occurs, the number of occurrences of a pause, etc. When a section where a pause is determined to occur is not sufficiently long, the pause may be determined not to be a pause intended by the speaker. Furthermore, a pause repeatedly occurred in a certain section may be determined to be a pause that is not intended by the speaker to distinguish the meaning, but a pause due to the speaking habit.

In operation S670, the electronic device 100 may add the pause tag to the first language-based text determined in operation S650, considering the above-described pause detection condition. For example, when the speech signal and each first language-based text satisfy the pause detection condition, the electronic device 100 may add the pause tag to the first language-based text.

In operation S670, the first language-based text to which the pause tag is added or the first language-based text to which the pause tag is not added as it does not satisfy the pause detection condition may be output as a result of the voice recognition.

For example, when the first language-based text determined in operation S650 is "Bob and . . . ", the electronic device 100 may determine whether the first language-based text satisfies the pause detection condition. The electronic device 100 may acquire "Bob [pause] and . . . " or "Bob and . . . " as the first language-based text, as a result of the determination.

As a result of n-best, a plurality of first language-based texts, instead a single first language-based text, may be output as a result of the voice recognition. Each first language-based text may have a probability value based on the language model 560. The first language-based texts each may be translated into a second language in the translation step. The second language-based text corresponding to each first language-based text may be generated as a translation result. A final score may be determined with respect to the second language-based text that is the translation result with respect to each first language-based text output as the n-best, as a result of the voice recognition. The final score of the second language-based text may be determined based on the probability value based on language model and the probability value based on the translation model. The final score may indicate a degree of matching of a text generated as the translation result with the translation result of a speech signal. According to an embodiment, the second language-based text having the highest final score may be converted to speech as a result of the speech translation and then output.

Figure 7:
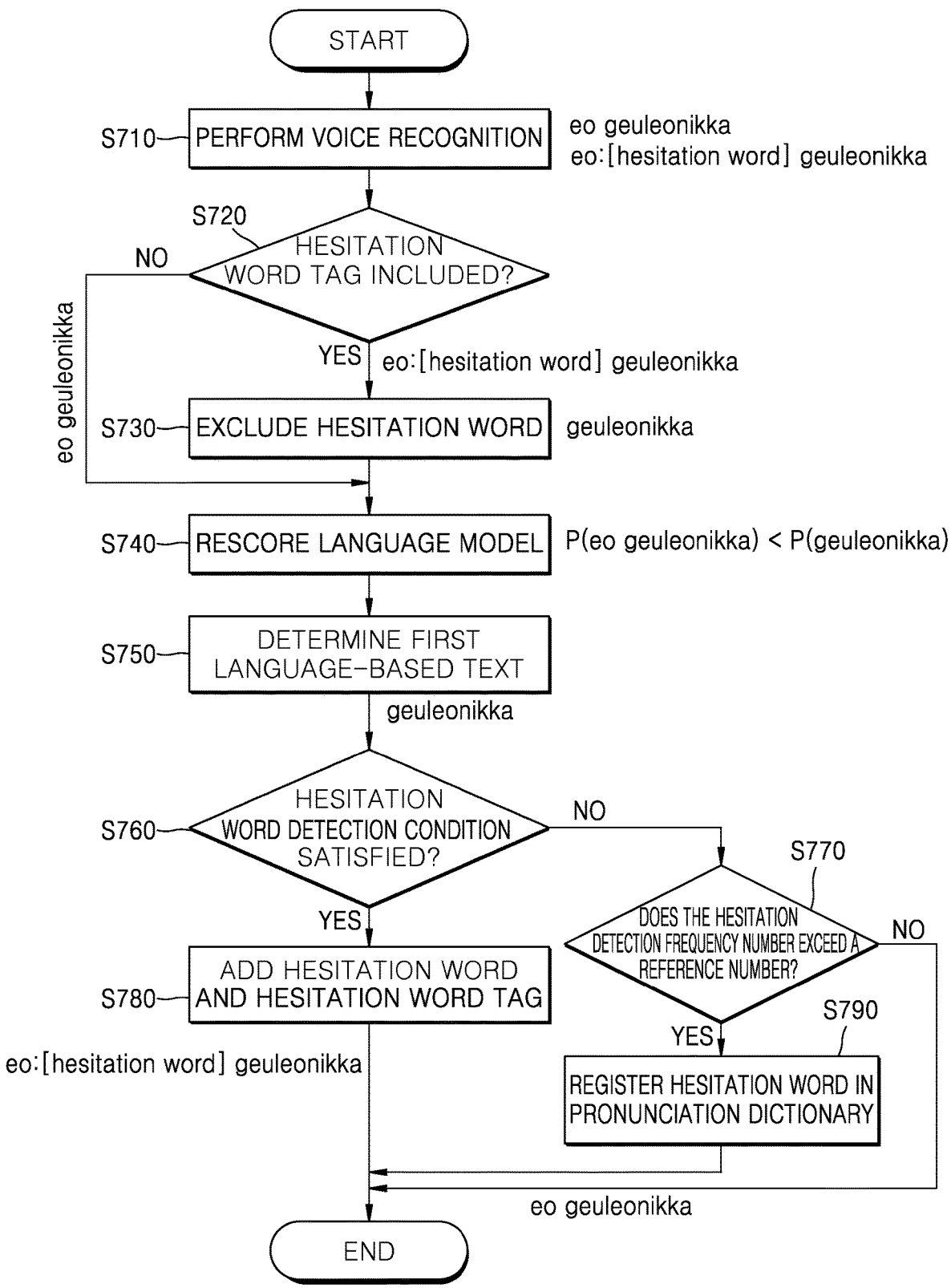
FIG. 7 is a flowchart of a method of adding hesitation word information to a first language-based text, according to an embodiment of the present disclosure.

FIG. 7 is a flowchart of a method of adding hesitation word information to a first language-based text, according to an embodiment of the present disclosure.

Referring to FIG. 7, in operation S710, the electronic device 100 may acquire at least one candidate sequence by performing voice recognition on the first language-based speech signal.

For example, when the non-verbal information includes hesitation word information, as illustrated in FIG. 7, a candidate sequence may include a tag indicating the hesitation word. According to an embodiment, as a vocabulary including the hesitation word tag is included in the pronunciation dictionary 550 or the language model 560, the candidate sequence including the hesitation word tag may be acquired in the voice recognition process.

For example, as illustrated in FIG. 7, "eo geuleonikka" and "eo:[hesitation word] geuleonikka" may be acquired as a candidate sequence for the same speech signal section. "eo:[hesitation word]" indicates that a vocabulary "eo" is determined to be a hesitation word.

In operation S720, the electronic device 100 may determine whether the candidate sequence includes a hesitation word tag. When the candidate sequence includes a hesitation word tag, in operation S730, the electronic device 100 may exclude the hesitation word tag from the candidate sequence to obtain a probability value according to the language model 560 with respect to the candidate sequence where the hesitation word is not included. The hesitation word tag may be excluded with the hesitation word.

In operation S740, the electronic device 100 may perform rescoring on the candidate sequence excluding the hesitation word, based on the language model 560. The electronic device 100 may obtain the probability value of the candidate sequence excluding the hesitation word again, by using the language model 560. For example, a probability value may be obtained again with respect to "geuleonikka" excluding the hesitation word and the hesitation word tag. The electronic device 100 may perform rescoring based on the language model 560 by comparing the probability value of the candidate sequence that is obtained again with a probability value of another candidate sequence. As a result of the rescoring, the order of priority with respect to each candidate sequence may be determined based on the probability value.

Since the non-verbal information including the hesitation word tag is information that is not represented in a text, it may be difficult to collect the non-verbal information as the text corpus 561. Accordingly, accuracy of a probability value of a text including the non-verbal information of the language model 560 may be lower than that of a probability value of other texts. Since the probability value of the candidate sequence acquired in the voice recognition process S710 is the probability value of the candidate sequence including the hesitation word tag, the electronic device 100 may obtain again the probability value of the candidate sequence that does not include a hesitation word tag. The electronic device 100 may acquire the probability value of the candidate sequence that does not include the hesitation word tag, of the candidate sequences, and determine a first language-based text of the candidate sequence based on the probability value obtained again.

In operation S750, the electronic device 100 may determine a first language-based text from the candidate sequence obtained in operation S710, based on the order of priority determined through the rescoring. For example, the electronic device 100 may determine the first language-based text based on the order of priority of each candidate sequence that is a result of the rescoring. For example, "geuleonikka" that is a candidate sequence having the highest order of priority may be determined to be the first language-based text.

In operation S760, the electronic device 100 may determine whether a section satisfying a hesitation word detection condition exists in the first language-based text determined in operation S750 and the speech signal. For example, in operation S730, when the candidate sequence excluding the hesitation word and the hesitation word tag is determined to be the first language-based text, it may be determined whether the section excluding the hesitation word and the hesitation word tag satisfies the hesitation word detection condition. As the hesitation word and the hesitation word tag detected in operation S710 are excluded from operation S730, the electronic device 100 may add the hesitation word and the hesitation word tag to the first language-based text in operation 780, based on the hesitation word detection condition.

The hesitation word detection condition may include, for example, the pitch of speech, the length of speech, etc. In an example, when the speech of a section determined to be a hesitation word is low or long, the hesitation word detection condition may be determined to be satisfied. The present disclosure is not limited thereto and the hesitation word detection condition may include various conditions.

When the first language-based text includes a section satisfying the hesitation word detection condition, in operation S780, the electronic device 100 may add the hesitation word and the hesitation word tag to the first language-based text. The first language-based to which the text hesitation word is added may be output as a result of the voice recognition.

When the first language-based text does not include a section satisfying the hesitation word detection condition, in operation S770, the electronic device 100 may determine whether the number of detections of the hesitation words in the voice recognition process S710 exceeds a reference number. The electronic device 100 may determine in the voice recognition process S710 whether the number of acquisitions of a candidate sequence including the hesitation word tag exceeds a reference value. When the number of detections of the hesitation word exceeds the reference value, in operation S790, the electronic device 100 may newly register the hesitation word in the pronunciation dictionary 550. The hesitation word that is newly registered in the pronunciation dictionary 550 may include a hesitation word that may be detected in a feature extraction operation, rather than in the pronunciation dictionary 550. In addition, in operation S790, to allow a hesitation word registered in the pronunciation dictionary 550 to be determined as a hesitation word in operation S760, the electronic device 100 may update the hesitation word detection condition in operation S760. Considering that the hesitation word is pronounced in various ways according to the speaker, the electronic device 100 may register a hesitation word that is repeated detected, but does not satisfy the hesitation word detection condition, in the pronunciation dictionary 550.

The first language-based text that does not include a section satisfying the hesitation word detection condition may be output as a result of the voice recognition, without addition of the hesitation word tag. For example, in operation S730, for the first language-based text excluding the hesitation word, in the voice recognition process S710, only a text detected as the hesitation word is added to the first language-based text, and the hesitation word tag may not be added thereto.

For example, when the first language-based text determined in operation S750 is "geuleonikka", in which the hesitation word "eo" is excluded in operation S730, the electronic device 100 may determine whether the first language-based text include a section satisfying the hesitation word detection condition. When the first language-based text includes the section satisfying the hesitation word detection condition, the electronic device 100 may acquire "eo:[hesitation word] geuleonikka" as the first language-based text. When the first language-based text does not include the section satisfying the hesitation word detection condition, the electronic device 100 may acquire "eo geuleonikka" that is a text before the hesitation word "eo" is excluded in operation S730. The embodiments described in FIGS. 6 and 7 are not limited to the case in which the non-verbal information included in first language-based text includes a pause or a hesitation word information, and may be applied to a case having non-verbal information of various forms. For example, even when the non-verbal information includes information about emphasized vocabularies, information about sentence patterns, information about non-standard words, etc., the embodiments of FIGS. 6 and 7 may be employed.

Figure 8:
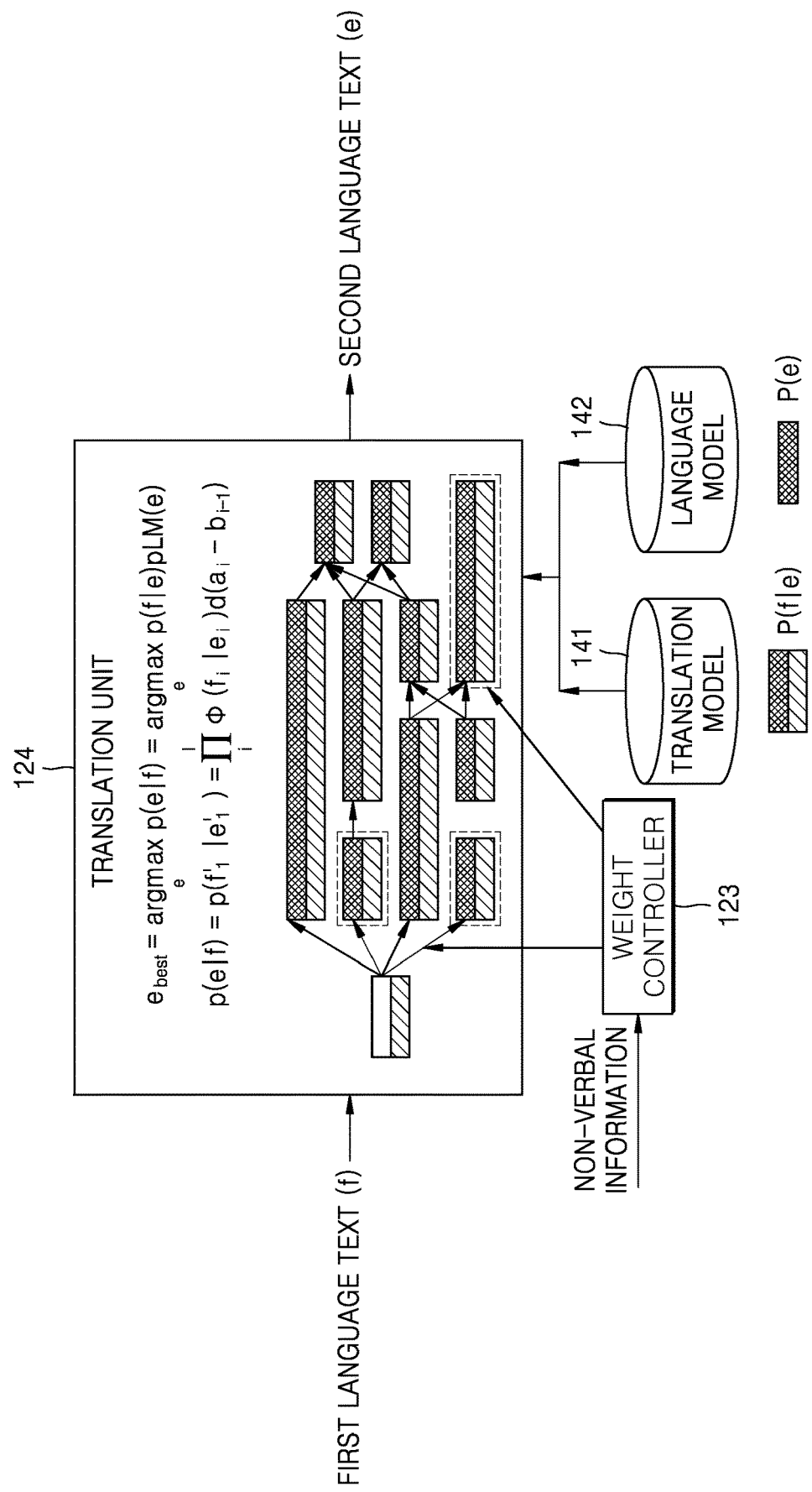
FIG. 8 illustrates an example of a method of performing translation on a first language-based text, according to an embodiment of the present disclosure.

FIG. 8 illustrates an example of a method of performing a translation on a first language-based text, according to an embodiment of the present disclosure.

The translation unit 124 and the weight controller 123 illustrated in FIG. 8 may correspond to the translation unit 124 and the weight controller 123 of FIG. 1.

Referring to FIG. 8, a first language-based text f may be translated in a second language by the translation unit 124, and a second language-based text e may be output as a translation result.

The translation unit 124 may translate a first language-based text into a second language-based text, based on probability values of a translation model 141 and a language model 142. P(e|f) that is a probability that a first language f is translated into a second language e may be acquired based on the translation model 141. The language model 142 may include P(e) that is a probability that the second language e appears on the condition of a word adjacent to the second language e. Although the language model 560 of FIG. 5 includes probability information of the first language f, the language model 142 of FIG. 8 may include probability information about the second language e.

The language model 142 of the second language, like the language model 560 of the first language, may be established based on a text corpus of the second language. Furthermore, the translation model 141 may be established based on a parallel corpus of the first language and the second language.

The translation unit 124 may acquire at least one second language-based text e according to Equation 1 below based on the translation model 141 and the language model 142.

$$e_{best} = \underset{e}{\operatorname{argmax}}\, p(e \mid f) = \underset{e}{\operatorname{argmax}}\, p(f \mid e) pLM(e) \qquad \text{Equation 1}$$

$$p(f \mid e) = p(f_1^I \mid e_1^I) = \prod_i^I \phi(f_i \mid e_i) d(a_i - b_{i-1})$$

In Equation 1, "pLM(e)" denotes a probability value acquired from the language model 142, and "p(f|e)" denotes a probability value acquired from the translation model 141.

In Equation 1, a value "i" denotes an index value of one of texts forming the second language-based text or first language-based text. Different index values may be assigned to words, phrases, sentences, etc. In an embodiment, the index value may be assigned to words, phrases, etc. existing in the translation model 141.

According to Equation 1, the second language-based text e of p(e|f) that is the maximum value of at least one p(e|f) value with respect to a certain section may be output as a translation result.

According to an embodiment, the probability value based on p(e|f) of Equation 1 may be acquired with respect to at least one second language-based text corresponding to a divided section of the first language-based text. The acquired probability value may be adjusted based on the non-verbal information. The second language-based text e output as the translation result may be determined based on the adjusted probability value.

The weight controller 123 may apply a weight to the probability value by Equation 1, based on the non-verbal information. For example, the weight controller 123 may apply a previously stored weight value with respect to a section including pause. As the weight value is applied to the probability value, the probability value may be adjusted based on the non-verbal information.

The section including pause may not be primarily translated in the viewpoint that pause intended by the speaker is to distinguish the meaning. According to an embodiment, as a weight value is applied to the probability value of a section including pause, the probability value of a section including pause may be adjusted to a low value. As the probability value of a section including pause is adjusted, the second language-based text e output as the translation result may be changed.

In an embodiment, the translation model 141 or the language model 142 may include a probability value of the second language-based text including the non-verbal information. For example, a probability value of a second language-based text including a pause tag or a hesitation word tag may exist in the translation model 141 or the language model 142. The probability value of the second language-based text including the non-verbal information may be treated as if the adjustment of the probability value based on the non-verbal information is already reflected. Accordingly, when the acquired probability value is a value of the second language-based text including the non-verbal information, the adjustment of the probability value based on the non-verbal information may not be performed.

Figure 9:
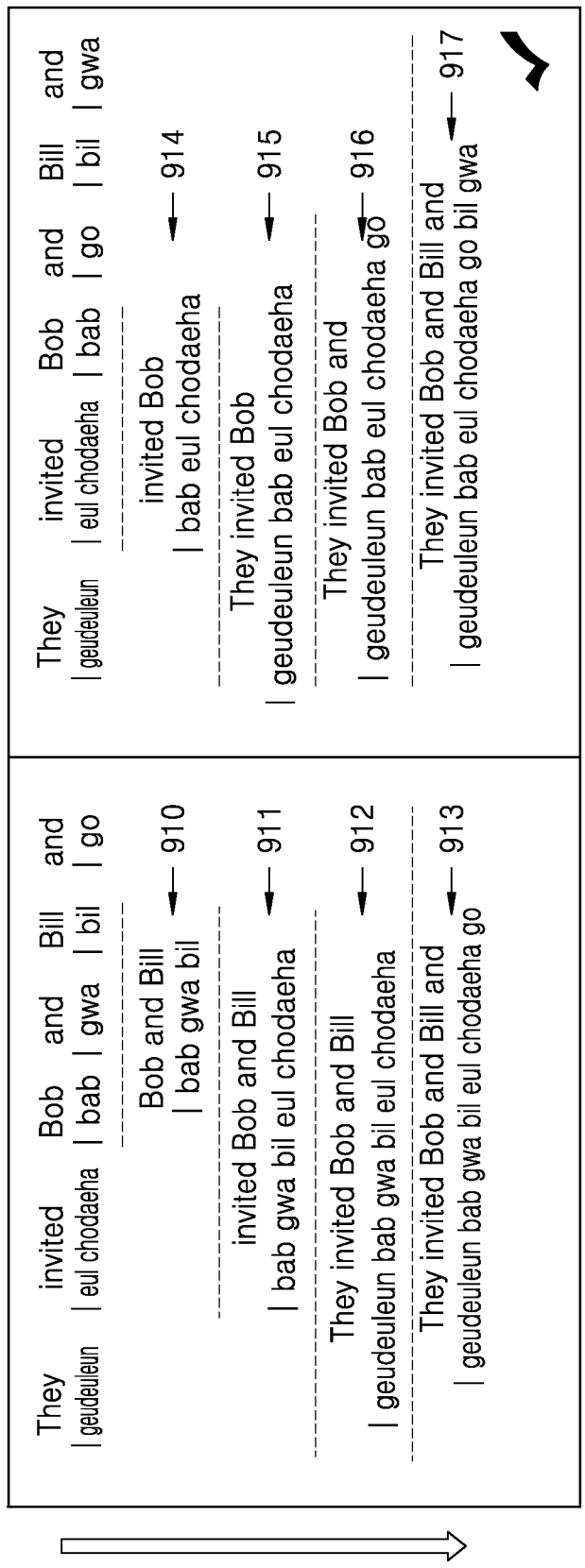
FIG. 9 illustrates an example of translating a first language-based text including a pause tag into a second language-based text, according to an embodiment of the present disclosure.

FIG. 9 illustrates an example of translating a first language-based text including a pause tag into a second language-based text, according to an embodiment of the present disclosure.

Referring to FIG. 9, "They invited Bob [pause] and Bill and Al got rejected" that is an English text generated as a result of the voice recognition may be translated into Korean. The English text may include a pause tag "[pause]" between "Bob" and "and" or with respect to "and".

Operations 910 to 913 and operations 914 to 917 show a result of the translation according to the different number of cases. The electronic device 100 may perform a translation by various methods including operations 910 to 917. The second language-based text and a probability value thereof may be acquired as a translation result with respect to each number of cases.

Referring to FIG. 9, a translation may be performed as adjacent vocabularies in a downward direction. When "Bob and Bill" or "invited Bob" is first translated among English texts, a translation may be performed as illustrated in FIG. 9. A translation may be performed as the respective sections of the first language-based texts are coupled in a different order or combination, in addition to the method of FIG. 9. For example, the electronic device 100 may first translate "They invited" among the English text.

The electronic device 100 according to an embodiment may output, as a translation result, a second language-based text having the highest probability value among at least one second language-based text acquired by various translation methods.

In operations 910 to 917, probability information of each section may be acquired based on at least one of the translation model 141 and the language model 142. The probability information of each section may be acquired through the above-described. Equation 1. According to an embodiment, at least one probability value acquired with respect to each section may be determined to be a value adjusted based on the non-verbal information.

Operation 910 indicates a case in which a section including "Bob and Bill" is first translated. "babgwa bit" that is a second language-based text corresponding to "Bob and Bill" and a probability value of "babgwa bil" may be acquired. Besides "babgwa bil", another second language-based text corresponding to "Bob and Bill" may be further acquired.

According to an embodiment, since the section of "Bob and Bill" includes a [pause] tag, the probability value of "babgwa bil" that is a second language-based text corresponding to the section of "Bob and Bill" may be adjusted. For example, the probability value of "babgwa bil" may be determined to be a lower value compared to a case having no [pause] tag.

Operation 911 shows a translation after "Bob and Bill" is translated, when "Bob and Bill" is first translated from the first language-based text. When "Bob and Bill" is first translated, "invited" or "and", which is a section adjacent to "Bob and Bill", and "Bob and Bill" may be combined with each other. Accordingly, the second language-based texts of a section in which "invited" and "Bob and Bill" are combined with each other and a section in which "Bob and Bill" and "and" are combined with each other, and the probability values thereof, may be acquired. The combined sections of "invited Bob and Bill" and "Bob and Bill and" are treated as different cases, and a translation of each case may be performed separately.

The second language-based text of the combined section may be acquired by the combination of each section and the second language-based text corresponding thereto. For example, "babgwa bileul chodaeha" that is a combination of "eul chodaeha" and "babgwa bil" may be acquired by the second language-based text of the combined section of "invited" and "Bob and Bill". The probability value of "babgwa bileul chodaeha" may be determined based on the probability values of "eul chodaeha" and "babgwa bil". For example, a value obtained by multiplying the probability values of "eul chodaeha" and "babgwa bil" may be determined to be the probability value of "babgwa bileul chodaeha". However, in an embodiment, as the probability value of "babgwa bil" is adjusted by the [pause] tag to be a lower value compared to the case having no [pause] tag, the probability value of "babgwa bileul chodaeha" may be determined to be a lower value compared to the case having no [pause] tag.

Operation 912 shows a translation of a next operation when "invited Bob and Bill" is first translated from the first language-based text. When "invited Bob and Bill" is first translated, an adjacent section "They" or "and" may be combined with "invited Bob and Bill". "geudeuleun babgwa bileul chodaeha" may be acquired as the second language-based text of "They invited Bob and Bill" that is one of the combined sections second language-based text.

The probability value of "geudeuleun babgwa bileul chodaeha" may be determined based on the probability values of "geudeuleun" and "babgwa bileul chodaeha". The probability value of "geudeuleun" may be acquired based on at least one of the translation model 141 and the language model 142. The probability value of "babgwa bileul chodaeha" is a value determined in operation 911. However, in an embodiment, as the probability value of "babgwa bileul chodaeha" is determined to be a lower value compared to the case having no [pause] tag, the probability value of "geudeuleun babgwa bileul chodaeha" based on the probability value of "babgwa bileul chodaeha" may be determined to be a lower value compared to the case having no [pause] tag.

In the following operations, the probability value of a case in which a translation is performed by first combining "Bob and Bill" may be determined to be a lower value compared to the case having no [pause] tag. Accordingly, the probability value of a case in which "Bob and Bill" is not first combined may have a value higher than a probability value of a case in which "Bob and Bill" is first combined and then a translation is performed. Furthermore, a second language-based text for a case in which "Bob and Bill" is not first combined may be highly likely to be selected as a final translation result.

Operation 913 shows a translation of a next operation when "They invited Bob and Bill" is first translated from the first language-based text. When "They invited Bob and Bill" is first translated, an adjacent section "and" may be combined with "They invited Bob and Bill". "geudeuleun babgwa bileul chodaehago" may be acquired as a second language-based text of "They invited Bob and Bill and" that is a combined section.

According to the translation method described in operations 910 to 913, at least one second language-based text corresponding to "They invited Bob and Bill and" that is the first language-based text, and the probability value of each second language-based text may be acquired. As described above, the probability value of "geudeuleun babgwa bileul chodaehago", which is based on the probability value of "babgwa bil", may be determined to be a lower value compared to the case having no [pause] tag.

Operation 914 indicates a case in which the combination of "invited Bob" instead of "Bob and Bill" is first performed. "babeul chodaeha" that is the second language-based text corresponding to "invited Bob" and the probability value of "babeul chodaeha" may be acquired. Besides "babeul chodaeha", the second language-based text corresponding to "invited Bob", for example, "bab-eul chocheonghae", "babeul buleu", etc., may be further be acquired.

According to an embodiment, since "invited Bob" does not include a [pause] tag unlike "Bob and Bill", the probability value acquired based on the translation model 141 may not be adjusted. Accordingly, according to an embodiment, the probability value of "babgwa bil" may be greater than the probability value of "babeul chodaeha".

Operation 915 shows a translation of a next operation when "invited Bob" is first translated. When "invited Bob" is first translated, an adjacent section "They" or "and" may be combined. Accordingly, second language-based texts of a combined section of "They" and "invited Bob" and a combined section of "invited Bob" and "and" and the probability values thereof may be acquired. The combined sections "They invited Bob" and "invited Bob and" are treated as different cases, and a translation of each case may be performed separately.

According to an embodiment, since the section "invited Bob and" includes the [pause] tag, the probability value of "babeul chodaehago" that is the second language-based text corresponding to the section "invited Bob and" may be adjusted. For example, the probability value of "babeul chodaehago" may be determined to be a lower value compared to the case having no [pause] tag. Since the probability value of the section "invited Bob and" is adjusted by the [pause] tag, the probability value of a section combined with "invited Bob and" may be determined to be a lower value compared to the case having no [pause] tag.

Operation 916 shows a translation of a next operation when "They invited Bob" is first translated. When "They invited Bob" is first translated, an adjacent section "and" may be combined with "They invited Bob".

According to an embodiment, since the section "They invited Bob and" includes the [pause] tag, the probability value of "geudeuleun babeul chodaehago" that is a second language-based text corresponding to the section "They invited Bob and" may be adjusted. However, the probability value of the section "They invited Bob and" may be adjusted to be higher than the probability value of a case in which the section including the [pause] tag, like "Bob and Bill", is first translated.

According to an embodiment, the probability value of a case in which the section including the [pause] tag is translated later may be relatively higher than the probability value of a case in which the section including the [pause] tag is first translated. Accordingly, the second language-based text of the case in which the section including the [pause] tag is translated layer may be output as a final translation result.

According to an embodiment, when the combined section includes the [pause] tag, the probability value of the second language-based text of the combined section may be adjusted. Accordingly, a translated sentence may be generated according to the speaker's intention to distinguish the meaning.

Figure 10:
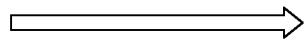
FIG. 10 illustrates an example of translating a first language-based text including a hesitation word tag into a second language-based text, according to an embodiment of the present disclosure.

FIG. 10 illustrates an example of translating a first language-based text including a hesitation word tag into a second language-based text, according to an embodiment of the present disclosure.

Referring to FIG. 10, "eo:[hesitation word] geuleonikka:[hesitation word] naega eum:[hesitation word] neol johahaneun geos gata" that is a Korean text generated as a result of the voice recognition may be translated into English. The hesitation word tag may be indicated as [hesitation word] and tagged with respect to a vocabulary determined to be a hesitation word. The indication ":[hesitation word]" in a text shows that a vocabulary corresponding to the indication is a hesitation word. As illustrated in FIG. 9, the hesitation word tag may be tagged with respect to "eo", "geuleonikka", and "eum".

Operations 1010 to 1012 and operations 1021 to 1023 show translation results according to different number of cases. The electronic device 100 is not limited to an example of FIG. 10 and the translation may be performed by various methods. As a translation result of each number of cases, a second language-based text and a probability value thereof may be acquired.

Referring to FIG. 10, a translation may be performed as vocabularies adjacent in a downward direction are combined one by one. When "naega eum:[hesitation word] neol johahaneun" is first translated in a Korean text, the translation may be first performed as illustrated in FIG. 10. In addition to the method of FIG. 10, the translation may be performed as the sections of the first language-based texts are combined in a different order or combination. For example, the electronic device 100 may first translate "geos gata" from the Korean text.

The electronic device 100 according to an embodiment may output, as a translation result, a second language-based text having the largest probability value among at least one second language-based text acquired by various translation methods.

In operations 1010 to 1012 and operations 1021 to 1023, probability information of each section may be acquired based on at least one of the translation model 141 and the language model 142. The probability information of each section may be acquired by the above-described Equation 1. According to an embodiment, the probability information acquired for each section may be determined to be a probability value adjusted based on the non-verbal information.

Operation 1010 shows a case in which a section including "naega eum neol johahaneun" is first translated, "I like you well" that is a second language-based text corresponding to "naega eum neol johahaneun", and a probability value of "I like you well", may be acquired. Besides "I like you well", another second language-based text corresponding to "naega eum neol johahaneun" may be further acquired.

According to an embodiment, since the section "naega eum neol johahaneun" includes a [hesitation word] tag, a probability value of "I like you well" that is the second language-based text corresponding to "naega eum neol johahaneun" may be adjusted. The probability value may be adjusted in such a way that "eum" that is a hesitation word is translated into a hesitation word of the second language that does not affect analysis of the meaning of another vocabulary.

For example, in "I like you well", since "eum" that is the hesitation word is translated into "well" that is not a hesitation word that may affect the analysis of the meaning of another vocabulary, the probability value of "I like you well" may be determined to be lower than the probability value of another second language-based text including a hesitation word other than "well". When "I uh like you" is acquired as another second language-based text corresponding to "naega eum neol johahaneun", "eum" that is the hesitation word is translated into "uh" that is a hesitation word of the second language, and thus the probability value of "I uh like you" may be determined to be a value higher than the above-described probability value of "I like you well".

Operation 1011 shows a translation of a next operation when "naega eum neol johahaneun" is first translated from the first language-based text. When "naega eum neol johahaneun" is first translated, "geos gata" or "eo geuleonikka" that is a section adjacent to "naega eum neol johahaneun"

may be combined with "naega eum neol johahaneun". Accordingly, second language-based texts of a combined section of "naega eum neol johahaneun" and "geos gata" and a combined section of "eo geuleonikka" and "naega eum neol johahaneun", and probability values thereof, may be acquired. Since "eo geuleonikka naega eum neol johahaneun" and "naega eum neol johahaneun geos gata" that are combined sections are treated as different numbers of cases, each case may be separately translated.

The second language-based text of the combined section may be acquired by a combination of the second language-based texts corresponding to the respective sections. For example, "I think I like you well" that is a combination of "I like you well" and "I think" may be acquired as a second language-based text with respect to the combined section of "naega eum neol johahaneun" and "geos gata". A probability value of "I think I like you well" may be determined based on the probability values of "I think" and "I like you well". For example, a value obtained by multiplying the probability values of "I think" and "I like you well" may be determined to be the probability value of "I think I like you well". However, in an embodiment, as the probability value of "I think I like you well" is determined to be lower than a probability value of another second language-based text including a hesitation word other than "well", the probability value of "I think I like you well" may be determined to be lower than a probability value of another second language-based text including a hesitation word other than "well".

Operation 1012 shows a translation of a next operation when "naega eum neol johahaneun geos gata" is first translated from the first language-based text. When "naega eum neol johahaneun geos gata" is first translated, "eo geuleonikka" that is an adjacent section may be combined with "naega eum neol johahaneun geos gata". "uh so I think I like you well" may be acquired as a second language-based text of "eo geuleonikka naega eum neol johahaneun geos gata" that is a combined section.

The probability value of "uh so I think I like you well" may be determined based on the probability values of "uh so" and "I think I like you well". The probability value of "I think I like you well" may be a value determined in the above-described operation 1011. However, in an embodiment, as the probability value of "I think I like you well" is determined to be lower than the probability value of another second language-based text including a hesitation word other than "well", the probability value of "uh so I think I like you well" based on "I think I like you well" may be determined to be lower than the probability value of another second language-based text including a hesitation word other than "well".

The probability value of "uh so" may be acquired based on at least one of the translation model 141 and the language model 142. However, since "eo geuleonikka" includes a [hesitation word] tag, the probability value of "uh so" that is the second language-based text corresponding to "eo geuleonikka" may be adjusted. For example, in "uh so", "geuleonikka" that is a hesitation word is translated into "so" that may affect the analysis of the meaning of another vocabulary, the probability value of "uh so" may be determined to be lower than a probability value of another second language-based text including a hesitation word other than "so".

According to an embodiment, the probability value of the second language-based text, in which "eum:[hesitation word]" is translated into "well" or "geuleonikka:[hesitation word]" is translated into "so", may be determined to be lower than a probability value of another second language-based text including a hesitation word other than "so". Accordingly, the probability value of a case in which "eum: [hesitation word]" is translated into "well" or "geuleonikka: [hesitation word]" is translated into "so", may be lower than a probability value of a case in which "eum:[hesitation word]" is translated into "uh" that is the hesitation word of the second language or "geuleonikka:[hesitation word]" is translated into "uh" that is the hesitation word of the second language. Furthermore, the second language-based text, in which "eum:[hesitation word]" is translated into "uh" that is the hesitation word of the second language or "geuleonikka: [hesitation word]" is translated into "so" that is the hesitation word of the second language, may be highly likely to be selected as a final translation result.

The hesitation word may be regarded as a word pronounced by a speaker without any meaning. However, the word determined to be a hesitation word may be translated into "so" or "well" that is a word having a meaning in a translated text. When the hesitation word is translated into a word having a meaning in the second language, the translated word may affect a translation of another word. Since the probability value by Equation 1 may be acquired based on a language model with respect to the second language, the translated word may affect a translation of other adjacent words. Accordingly, a translation result that is different from the speaker's intention to translate the hesitation word to have no meaning may be generated. According to an embodiment, for a vocabulary determined to be the hesitation word, by adjusting a probability value of each section not to affect a translation of other vocabularies, translation performance may be improved further.

Operations 1021 to 1023 show a method of performing a translation by excluding a section including a hesitation word from the first language-based text.

Operation 1021 shows a case in which a section including "naega eum neol johahaneun" is first translated. A second language-based text with respect to "naega neol johahaneun", from which "eum" that is the hesitation word is excluded, may be acquired based on the translation model 141 and the language model 142. For example, "I like you" as a second language-based text with respect to "naega neol johahaneun", and a probability value thereof, may be acquired. A hesitation word of the second language corresponding to the excluded hesitation word may be added to "I like you" acquired as a second language-based text. Accordingly, "I uh like you" may be acquired as a second language-based text corresponding to "naega eum neol johahaneun".

Unlike operations 1010 to 1012, in operations 1021 to 1023, as the translation is performed by excluding the hesitation word, the probability value of the second language-based text may not be adjusted by a hesitation word tag.

Operation 1022 shows a case in which a section including "naega eum neol johahaneun geos gata" is first translated. A second language-based text with respect to "naega neol johahaneun geos gata", from which "eum" that is the hesitation word is excluded, may be acquired. For example, "I think I like you" as the second language-based text with respect to "naega neol johahaneun geos gata", and a probability value thereof, may be acquired. The probability value of "I think I like you" may be determined based on the probability of "I like you" acquired in operation 1021 and the probability value of "I think".

A hesitation word of the second language corresponding to the excluded hesitation word may be added to "I think I like you" acquired as the second language-based text. Accordingly, "I think I uh like you" may be acquired as a second language-based text corresponding to "naega eum neol johahaneun".

Operation 1023 shows a translation in a next operation when "naega eum neol johahaneun geos gata" is first translated from the first language-based text. When "naega eum neol johahaneun geos gata" is first translated, an adjacent section "eo geuleonikka" may be combined with "naega eum neol johahaneun geos gata". A second language-based text with respect to "naega neol johahaneun geos gata", from which "eo geuleonikka" and "eum" that are hesitation words are excluded, may be acquired. However, the second language-based text with respect to "naega neol johahaneun geos gata" is already acquired in operation 1022. Accordingly, as "uh" that is the hesitation word of the second language is added to the second language-based text acquired in operation 1022, "uh uh I think I uh like you" may be acquired as the second language-based text of "eo geuleonikka naega eum neol johahaneun geos gata.".

As the probability information is determined by excluding the hesitation word from the first language-based text, the probability value of "uh uh I think I uh like you" may be determined to be the same as the probability information of the second language-based text already acquired in operation 1022.

As in the above-described operations 1021 to 1023, when the electronic device 100 performs a translation by excluding the hesitation word from the first language-based text, a mistranslation due to the hesitation word may be reduced during the translation.

According to an embodiment, as a speech translation is performed considering the non-verbal information included in the input speech signal, performance of the speech translation may be improved.

An embodiment of the present disclosure may be embodied in form of a non-transitory recording medium including computer executable command languages such as a program module executed by a computer. A non-transitory computer-readable storage medium may be a useable medium that may be accessed by a computer and may include all of volatile and non-volatile media or a separable and inseparable media. Also, the non-transitory computer-readable storage medium may include all of a computer storage medium and a communication medium. The non-transitory computer-readable storage medium may include all of volatile and non-volatile media or a separable and inseparable media embodied by a certain method or technology for storing information such as computer-readable command languages, data structures, program modules, or other data. The communication medium may typically include computer-readable command languages, data structures, program modules, or other data of a modulated data signal, or other transmission mechanism, and may also include a certain information forwarding medium.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner.

Furthermore, the non-transitory computer-readable recording medium can also be distributed over network coupled computer systems so that the computer-readable code is stored and executed in a distributive manner. This media can be read by the computer, stored in the memory, and executed by the processor.

The particular implementations shown and described herein are illustrative examples of the inventive concept and are not intended to otherwise limit the scope of the inventive concept in any way. For the sake of brevity, various electronics, control systems, software development and other functional aspects of the systems may not be described in detail according to the related art.

Terms such as "unit", "module", etc. stated in the specification may signify a unit to process at least one function or operation and the unit may be embodied by hardware, software, or a combination of hardware and software.

The unit or module may be configured to be located in a storage medium to be addressed or implemented by a program that may be executed by a processor.

For example, the unit as an example includes constituent elements such as software constituent elements, object-oriented software constituent elements, class constituent elements, and task constituent elements, processes, functions, attributes, procedures, sub-routines, segments of program codes, drivers, firmware, microcodes, circuits, data, databases, data structures, tables, arrays, and variables.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of translating a first language-based speech signal into a second language, the method comprising:
   receiving the first language-based speech signal;
   converting the first language-based speech signal into a first language-based text including non-verbal information, by performing voice recognition on the first language-based speech signal; and
   translating the first language-based text into the second language, based on the non-verbal information,
   wherein the converting of the first language-based speech signal into the first language-based text including the non-verbal information by performing voice recognition on the first language-based speech signal comprises:
      acquiring at least one first language-based candidate sequence corresponding to the speech signal;
      excluding non-verbal information included in the acquired at least one first language-based candidate sequence from each of the acquired at least one first language-based candidate sequence;
      acquiring probability information based on a language model, with respect to each of the at least one first language-based candidate sequence excluding the non-verbal information;
      determining at least one from among the at least one first language-based candidate sequence to be the first language-based text, based on the acquired probability information; and
      adding the excluded non-verbal information to the first language-based text, based on information about a condition for detecting the non-verbal information from the speech signal, and wherein the first language-based text including the non-verbal information is translated into the second language.

2. The method of claim 1, wherein the non-verbal information comprises at least one of information about emphasized vocabularies, information about sentence patterns, information about non-standard words, information about pauses, or information about hesitation words.

3. The method of claim 1, wherein the translating of the first language-based text into the second language comprises:

acquiring at least one section divided from the first language-based text;

determining probability information of the at least one section, based on the non-verbal information; and translating the first language-based text into the second language, based on the probability information.

4. The method of claim 3, wherein the determining of the probability information comprises:

combining at least one section and a section adjacent to the at least one section; and based on whether the combined section includes the non-verbal information, determining the probability information of the combined section.

5. The method of claim 3, wherein the determining of the probability information comprises:

detecting a section including a hesitation word from the at least one section, based on the non-verbal information; and determining probability information of a section including the hesitation word such that the hesitation word is translated into the hesitation word of the second language.

6. The method of claim 3, wherein the determining of the probability information comprises:

excluding a section including a hesitation word from the at least one section, based on the non-verbal information; and determining probability information of the at least one section from which the section including the hesitation word is excluded.

7. An electronic device for translating a first language-based speech signal into a second language, the electronic device comprising:

a receiver configured to receive the first language-based speech signal;

a processor coupled to the receiver and an outputter, and configured to:

convert the first language-based speech signal into a first language-based text including non-verbal information, by performing voice recognition on the first language-based speech signal, and translate the first language-based text into the second language, based on the non-verbal information; and the outputter configured to output a result of the translation into the second language, wherein, to convert the first language-based speech signal into a first language-based text including non-verbal information by performing voice recognition on the first language-based speech signal, the processor is further configured to:

acquire at least one first language-based candidate sequence corresponding to the speech signal, exclude non-verbal information included in the acquired at least one first language-based candidate sequence from each of the acquired at least one first language-based candidate sequence, acquire probability information based on a language model, with respect to each of the at least one first language-based candidate sequence excluding the non-verbal information, determine at least one from among the at least one first language-based candidate sequence to be the first language-based text, based on the acquired probability information, and add the excluded non-verbal information to the first language-based text, based on information about a condition for detecting the non-verbal information from the speech signal, and wherein the first language-based text including the non-verbal information is translated into the second language.

8. The electronic device of claim 7, wherein the non-verbal information comprises at least one of information about emphasized vocabularies, information about sentence patterns, information about non-standard words, information about pauses, or information about hesitation words.

9. The electronic device of claim 7, wherein the processor is further configured to:

acquire at least one section divided from the first language-based text, determine probability information of the at least one section based on the non-verbal information, and translate the first language-based text into the second language, based on the probability information.

10. The electronic device of claim 9, wherein the processor is further configured to:

combine at least one section and a section adjacent to the at least one section, and based on whether the combined section includes the non-verbal information, determine probability information of the combined section.

11. The electronic device of claim 9, wherein the processor is further configured to:

identify a section including a hesitation word from the at least one section, based on the non-verbal information, and determine probability information of a section including the hesitation word such that the hesitation word is translated into the hesitation word of the second language.

12. The electronic device of claim 9, wherein the processor is further configured to:

exclude a section including a hesitation word from the at least one section, based on the non-verbal information, and determine probability information of the at least one section from which the section including the hesitation word is excluded.

13. The electronic device of claim 7, wherein the receiver comprises at least one of a microphone, a communication circuit, or a camera.

14. The electronic device of claim 7, wherein the outputter comprises at least one of a speaker, a communication circuit, or a display.

15. A non-transitory computer-readable recording medium having recorded thereon a program, which when executed by a processor, causes the processor to:

control to receive a first language-based speech signal;
convert the first language-based speech signal into a first language-based text including non-verbal information, by performing voice recognition on the first language-based speech signal; and
translate the first language-based text into a second language, based on the non-verbal information,
wherein, to convert the first language-based speech signal into a first language-based text including non-verbal information by performing voice recognition on the first language-based speech signal, the program further causes the processor to:
  acquire at least one first language-based candidate sequence corresponding to the speech signal;
  exclude non-verbal information included in the acquired at least one first language-based candidate sequence from each of the acquired at least one first language-based candidate sequence;
  acquire probability information based on a language model, with respect to each of the at least one first language-based candidate sequence excluding the non-verbal information;
  determine at least one from among the at least one first language-based candidate sequence to be the first language-based text, based on the acquired probability information; and
  add the excluded non-verbal information to the first language-based text, based on information about a condition for detecting the non-verbal information from the speech signal, and
wherein the first language-based text including the non-verbal information is translated into the second language.

16. The non-transitory computer-readable recording medium of claim 15, wherein the program, which when executed by the processor, further causes the processor to:
  acquire at least one section divided from the first language-based text;
  determine probability information of the at least one section based on the non-verbal information; and
  translate the first language-based text into the second language, based on the probability information.

* * * * *